United States Patent
Ye et al.

(10) Patent No.: US 10,812,810 B2
(45) Date of Patent: Oct. 20, 2020

(54) METHOD AND APPARATUS FOR VIDEO CODING IN MERGE MODE

(71) Applicant: Tencent America LLC, Palo Alto, CA (US)

(72) Inventors: Jing Ye, San Jose, CA (US); Xiang Li, San Diego, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/205,053

(22) Filed: Nov. 29, 2018

(65) Prior Publication Data
US 2019/0246118 A1    Aug. 8, 2019

Related U.S. Application Data

(60) Provisional application No. 62/627,194, filed on Feb. 6, 2018.

(51) Int. Cl.
| | | |
|---|---|---|
| *H04N 19/176* | (2014.01) | |
| *H04N 19/70* | (2014.01) | |
| *H04N 19/44* | (2014.01) | |
| *H04N 19/46* | (2014.01) | |
| *H04N 19/52* | (2014.01) | |

(52) U.S. Cl.
CPC ........... *H04N 19/176* (2014.11); *H04N 19/44* (2014.11); *H04N 19/46* (2014.11); *H04N 19/52* (2014.11); *H04N 19/70* (2014.11)

(58) Field of Classification Search
CPC ...... H04N 19/176; H04N 19/52; H04N 19/46; H04N 19/70; H04N 19/44
See application file for complete search history.

(56) References Cited

U.S. PATENT DOCUMENTS

2014/0341284 A1* 11/2014 Kim ..................... H04N 19/122
                                                    375/240.12
2015/0117543 A1*  4/2015 Hong ................... H04N 19/533
                                                    375/240.16
(Continued)

FOREIGN PATENT DOCUMENTS

WO   WO-2017036414 A1 *  3/2017  ........... H04N 19/176
WO   WO-2017197126 A1 * 11/2017  ............. H04N 19/51

OTHER PUBLICATIONS

Han et al. "A Dynamic Motion Vector Referencing Scheme for Video Coding" IEEE, ICIP 2016 (Year: 2016).*

(Continued)

*Primary Examiner* — Richard A Hansell, Jr.
(74) *Attorney, Agent, or Firm* — Oblon, McClelland, Maier & Neustadt, L.L.P.

(57) ABSTRACT

A method for video coding using a merge mode by a decoder or encoder. An embodiment of the method includes receiving a current block having a block size, setting a grid pattern based on the block size of the current block, wherein the grid pattern partitions a search region adjacent to the current block into search blocks, and a size of the search blocks is determined according to the block size of the current block, and searching for one or more spatial merge candidates from candidate positions in the search blocks to construct a candidate list that includes the one or more spatial merge candidates.

17 Claims, 21 Drawing Sheets

(56) References Cited

U.S. PATENT DOCUMENTS

| | | | |
|---|---|---|---|
| 2015/0181208 A1* | 6/2015 | Park | H04N 19/196 |
| | | | 375/240.02 |
| 2016/0119642 A1* | 4/2016 | Wu | H04N 19/105 |
| | | | 375/240.12 |
| 2016/0381374 A1* | 12/2016 | Bang | H04N 19/597 |
| | | | 375/240.16 |
| 2017/0347093 A1* | 11/2017 | Yu | H04N 19/176 |
| 2018/0152699 A1* | 5/2018 | Kumar | H04N 19/174 |
| 2018/0192071 A1* | 7/2018 | Chuang | H04N 19/517 |
| 2018/0242024 A1* | 8/2018 | Chen | H04N 19/66 |
| 2018/0249154 A1* | 8/2018 | Chuang | H04N 19/105 |
| 2018/0359483 A1* | 12/2018 | Chen | H04N 19/44 |

OTHER PUBLICATIONS

Han, Jingning et al. "A Dynamic Motion Vector Referencing Scheme for Video Coding,", Sep. 2016, ICIP.

High Efficiency Video Coding, Recommendation ITU-T H.265 v 4; Dec. 2016.

* cited by examiner

| Merge index | Code word | | | | | | | |
|---|---|---|---|---|---|---|---|---|
| 0 | 0 | | | | | | | |
| 1 | 1 | 0 | | | | | | |
| 2 | 1 | 1 | 0 | | | | | |
| 3 | 1 | 1 | 1 | 0 | | | | |
| 4 | 1 | 1 | 1 | 1 | 0 | | | |
| 5 | 1 | 1 | 1 | 1 | 1 | 0 | | |
| 6 | 1 | 1 | 1 | 1 | 1 | 1 | 0 | |
| 7 | 1 | 1 | 1 | 1 | 1 | 1 | 1 | xxxx |
| ... | ... | ... | ... | ... | ... | ... | ... | ... |
| 22 | 1 | 1 | 1 | 1 | 1 | 1 | 1 | xxxx |

FIG. 17

| Merge index | Code word | | | | | | | |
|---|---|---|---|---|---|---|---|---|
| 0 | 0 | 1 | | | | | | |
| 1 | 0 | 0 | 1 | | | | | |
| 2 | 0 | 0 | 0 | 1 | | | | |
| 3 | 0 | 0 | 0 | 0 | 1 | | | |
| 4 | 0 | 0 | 0 | 0 | 0 | 1 | | |
| 5 | 0 | 0 | 0 | 0 | 0 | 0 | 1 | |
| 6 | 0 | 0 | 0 | 0 | 0 | 0 | 0 | 1 |
| 7 | 1 | x | x | x | x | | | |
| ... | ... | ... | ... | ... | ... | | | |
| 22 | 1 | x | x | x | x | | | |

FIG. 18

```
seq_parameter_set_rbsp() {
    sps_video_parameter_set_id
    sps_max_sub_layers_minus1
    sps_temporal_id_nesting_flag
    profile_tier_level(1, sps_max_sub_layers_minus1)
    sps_seq_parameter_set_id
    chroma_format_idc
    if( chroma_format_idc == 3 )
        separate_colour_plane_flag
    pic_width_in_luma_samples
    pic_height_in_luma_samples
    ...
    merge_candidate_search_offset
    merge_candidate_search_grid
    merge_pruning_threshold
}
```

FIG. 19

```
seq_parameter_set_rbsp() {
    sps_video_parameter_set_id
    sps_max_sub_layers_minus1
    sps_temporal_id_nesting_flag
    profile_tier_level(1, sps_max_sub_layers_minus1)
    sps_seq_parameter_set_id
    chroma_format_idc
    if( chroma_format_idc == 3 )
        separate_colour_plane_flag
    pic_width_in_luma_samples
    pic_height_in_luma_samples
    ...
    merge_candidate_search_offset_x
    merge_candidate_search_offset_y
    merge_candidate_search_grid_width
    merge_candidate_search_grid_height
    merge_pruning_threshold
}
```

FIG. 20

```
pic_parameter_set_rbsp() {
    pps_pic_parameter_set_id
    pps_seq_parameter_set_id
    dependent_slice_segments_enabled_flag
    output_flag_present_flag
    num_extra_slice_header_bits
    sign_data_hiding_enabled_flag
    cabac_init_present_flag
    num_ref_idx_l0_default_active_minus1
    num_ref_idx_l1_default_active_minus1
    ...
    merge_candidate_search_offset
    merge_candidate_search_grid
    merge_pruning_threshold
    ...
}
```

FIG. 21

```
pic_parameter_set_rbsp() {
    pps_pic_parameter_set_id
    pps_seq_parameter_set_id
    dependent_slice_segments_enabled_flag
    output_flag_present_flag
    num_extra_slice_header_bits
    sign_data_hiding_enabled_flag
    cabac_init_present_flag
    num_ref_idx_l0_default_active_minus1
    num_ref_idx_l1_default_active_minus1
    ...
    merge_candidate_search_offset_x
    merge_candidate_search_offset_y
    merge_candidate_search_grid_width
    merge_candidate_search_grid_height
    merge_pruning_threshold
    ...
}
```

FIG. 22

METHOD AND APPARATUS FOR VIDEO CODING IN MERGE MODE

INCORPORATION BY REFERENCE

This present disclosure claims the benefit of priority to U.S. Provisional Application No. 62/627,194, "Methods and Apparatus for Inter Prediction with Merge in Video Coding" filed on Feb. 6, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from neighboring area's MVs. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge."

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighbor block is using.

SUMMARY

Aspects of the disclosure provide method and apparatus for video coding. In some embodiments, a method for video coding using a merge mode by a decoder or encoder can include receiving a current block having a block size, setting a grid pattern based on the block size of the current block, wherein the grid pattern partitions a search region adjacent to the current block into search blocks, and a size of the search blocks is determined according to the block size of the current block, and searching for one or more spatial merge candidates from candidate positions in the search blocks to construct a candidate list that includes the one or more spatial merge candidates.

In an embodiment, the method further includes when the block size of the current block is larger than a first threshold, determining the search block size to be a first size, and when the block size of the current block is smaller than the first threshold, determining the search block size to be a second size that is smaller than the first size.

In an embodiment, the method further includes searching a subset of the search blocks corresponding to a set of predetermined candidate positions for the one or more spatial merge candidates.

In an embodiment, the method includes performing a first round of search over a first set of predetermined candidate positions in a nearest neighborhood of the current block. The first set of predetermined candidate positions includes: candidate position (d0) located at a bottom-left corner of the current block, candidate position (a0) located at a left side of the current block and next to the candidate position (d0), candidate position (c0) located at a top-right corner of the current block, candidate position (b0) located at a top side of the current block and next to the reference position (c0), and candidate position (e0) located at a top-left corner of the current block. The method further includes performing a second round of search over a second set of predetermined candidate positions in a neighborhood that is one search block away from the current block and next to the nearest neighborhood of the current block. The second set of predetermined candidate positions includes candidate position (d1) located one search block away leftwards from the candidate position (d0), candidate position (a1) located one search block away leftwards from the candidate position (a0), candidate position (c1) located one search block away upwards from the candidate position (c0), candidate position (b1) located one search block away upwards from the candidate position (b0), and candidate position (e1) located one search block away to the top-left direction of the candidate position (e0).

In one example, the method further includes determining whether the candidate list is fully filled after the first round of search, when the candidate list is not fully filled, proceeding with the second round of search, and when the candidate list is fully filled, terminating the operation of searching for one or more spatial merge candidates to construct the candidate list.

In an embodiment, the method further includes sequentially performing multiple rounds of search from a nearest neighborhood of the current block to a furthest neighborhood of the current block, each round of search being performed on a respective neighborhood. A first round of the multiple rounds of search is performed over the nearest neighborhood that includes the following predetermined candidate positions first candidate position (d0) located at a bottom-left corner of the current block, second candidate position (a0) located at a left side of the current block and next to the candidate position (d0), third candidate position (c0) located at a top-right corner of the current block, fourth candidate position (b0) located at a top side of the current block and next to the reference position (c0), and fifth candidate position (e0) located at a top-left corner of the current block.

A next round of the multiple rounds of search is performed over a next neighborhood after a previous round of the multiple rounds of search that is performed over a previous neighborhood, the next neighborhood is one search block away from the previous neighborhood of the current block. The next neighborhood includes the following predetermined candidate positions first candidate position (dN) located one search block away leftwards from the first candidate position (dP) of the previous neighborhood, second candidate position (aN) located one search block away leftwards from the second candidate position (aP) of the previous neighborhood, third candidate position (cN) located one search block away upwards from the third candidate position (cP) of the previous neighborhood, fourth candidate position (bN) located one search block away upwards from the fourth candidate position (bP) of the previous neighborhood, and fifth candidate position (eN) located one search block away to the top-left direction of the fifth candidate position (eP) of the previous neighborhood.

In one example, the method further includes sequentially performing the multiple rounds of search from the nearest neighborhood of the current block to the furthest neighborhood of the current block until the candidate list is fully filled.

In an embodiment, the search region includes a first set of candidate positions as defined in the high efficiency video coding (HEVC) standard in search blocks of a first neighborhood adjacent to the current block, and the candidate positions, from which the one or more spatial merge candidates are searched for, are extended, left-wards, top-wards and left-top-wards with respect to the first set of candidate positions at the left, top and left-top of the current block, respectively, from the first neighborhood adjacent to the current block to neighborhoods that are non-adjacent to the current block, and are a search block away from the current block.

In an embodiment, the method further includes adding the one or more spatial merge candidates except a set of spatial merge candidates selected from the search blocks immediately adjacent to the current block to the candidate list at positions after a temporal merge candidate.

In an embodiment, the method further includes comparing a merge candidate obtained by searching the search region with an existing merge candidate listed on the candidate list, when a difference between the obtained merge candidate and the existing merge candidate is larger than a pruning threshold, adding the obtained merge candidate to the candidate list, and when the difference between the obtained merge candidate and the existing merge candidate is smaller than the pruning threshold, not adding the obtained merge candidate on the candidate list.

In an embodiment, the search blocks have a square and/or non-square shape.

In an embodiment, the method further includes signaling one of the following syntax elements from the encoder in sequence level, picture level, or slice level: a first syntax element indicating an offset with respect to the current block for defining the search region, wherein an x coordinate and y coordinate of a top-left corner sample of the search region are equal with each other, and take the value of the offset, a second syntax element indicating the size of the search blocks having a square shape, a third syntax element indicating a pruning threshold, a fourth syntax element and a fifth syntax element indicating an x direction offset and a y direction offset with respect to the current block for defining the search region, wherein the x coordinate and y coordinate of the top-left corner sample of the search region are not equal with each other, and take the values of the x direction offset and y direction offset, respectively, or a sixth syntax element and a seventh syntax element indicating a width and a height of the search blocks having a rectangle shape.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which:

FIGS. 17-18 show examples of codewords for coding merge indexes according to embodiments of the disclosure.

FIGS. 19-22 show examples of syntax elements for signaling of merge mode control parameters according to embodiments of the disclosure.

DETAILED DESCRIPTION OF EMBODIMENTS

Figure 1:
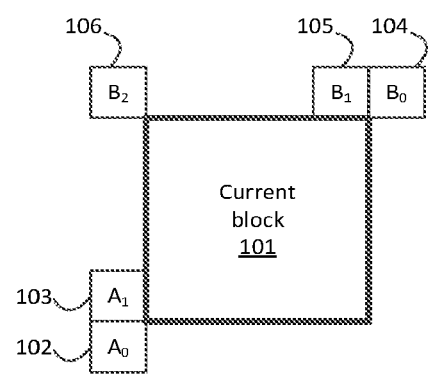
FIG. 1 is a schematic illustration of a current block and its surrounding spatial merge candidates in accordance with H.265/HEVC.
Figure 2:
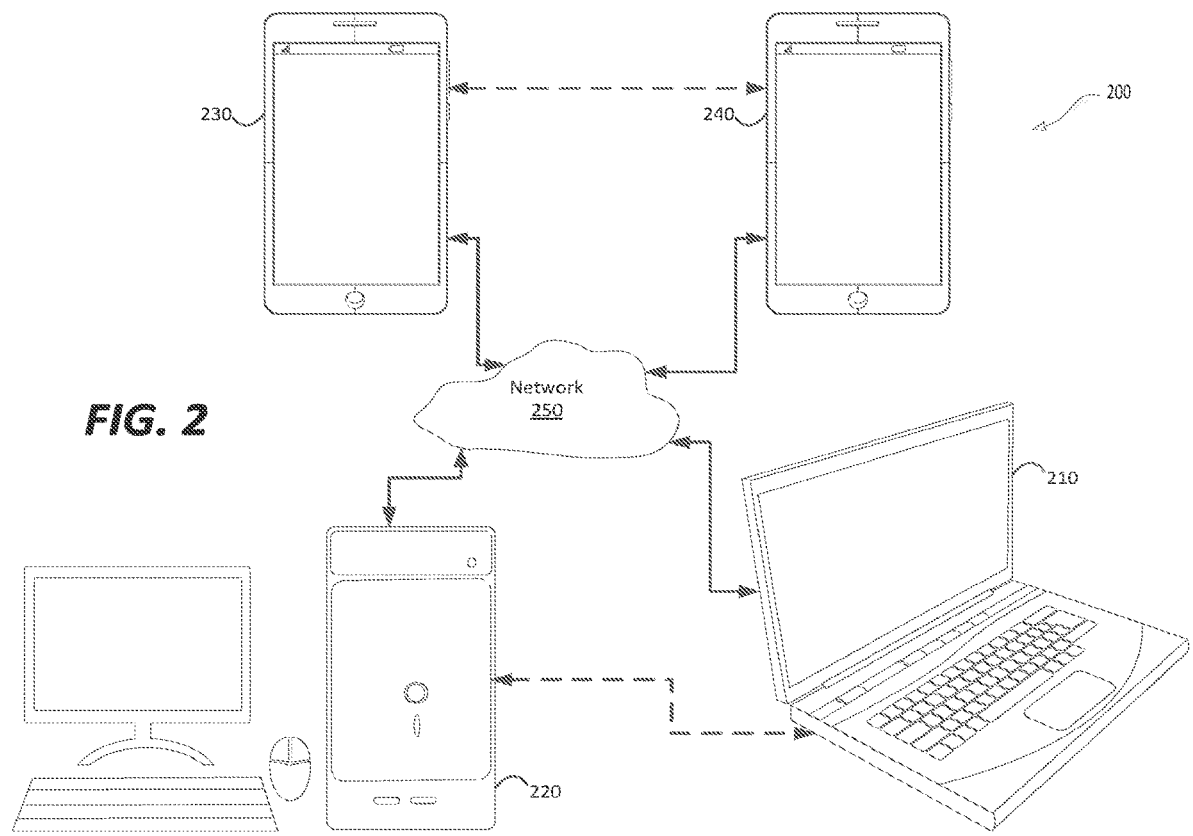
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
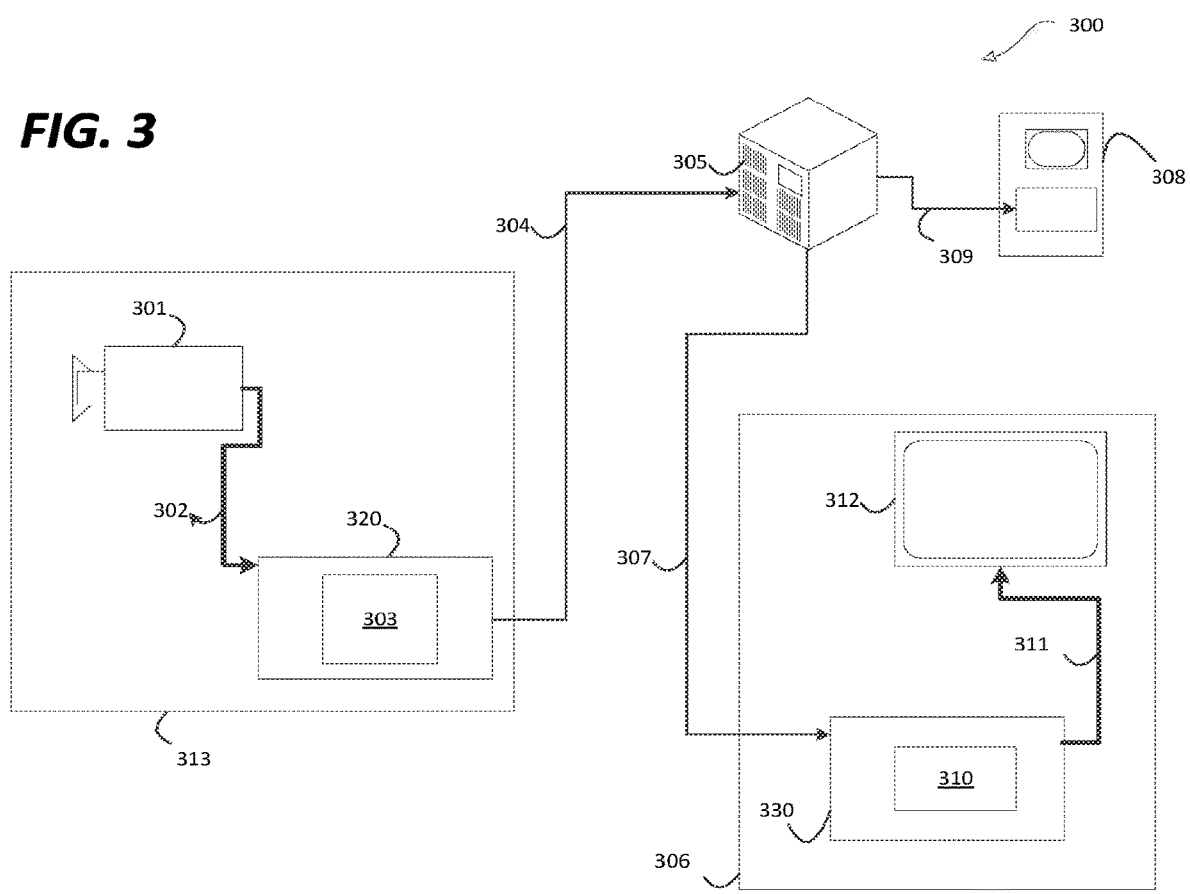
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
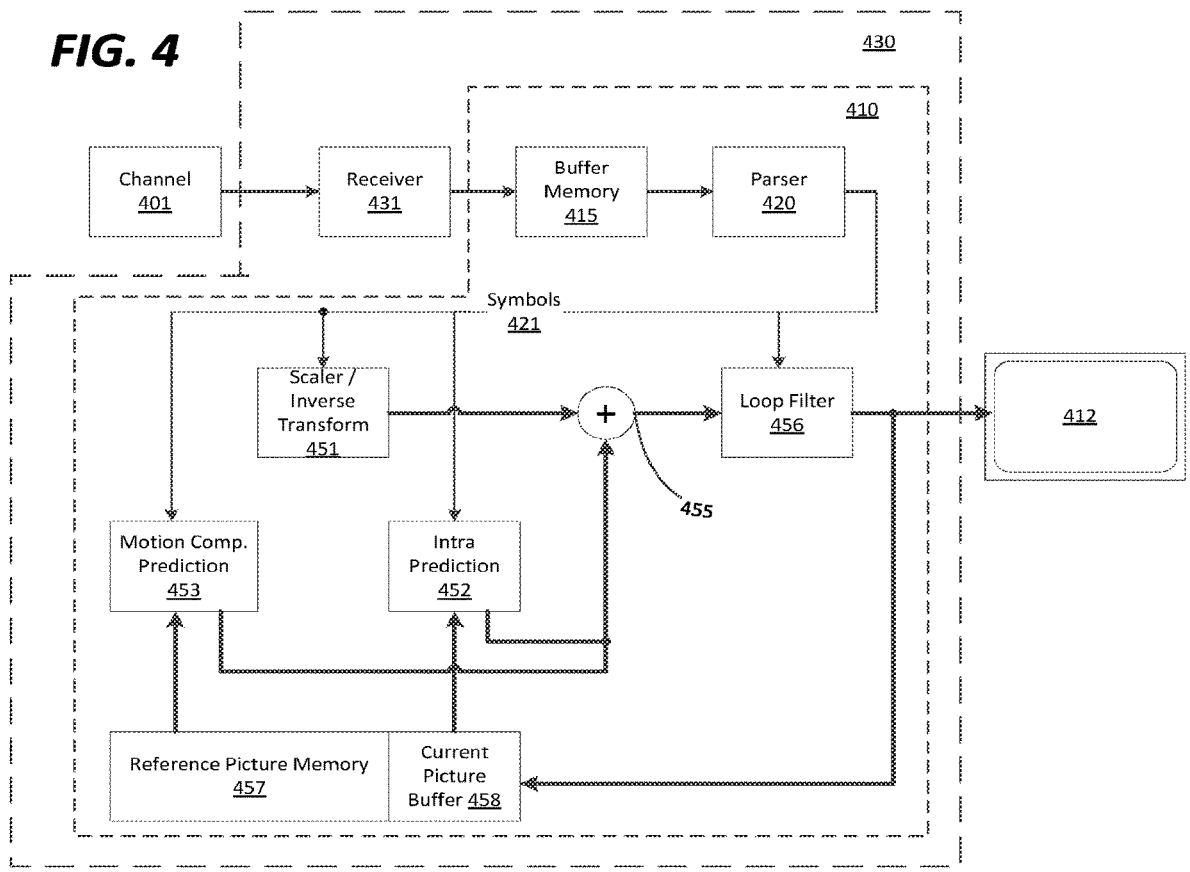
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
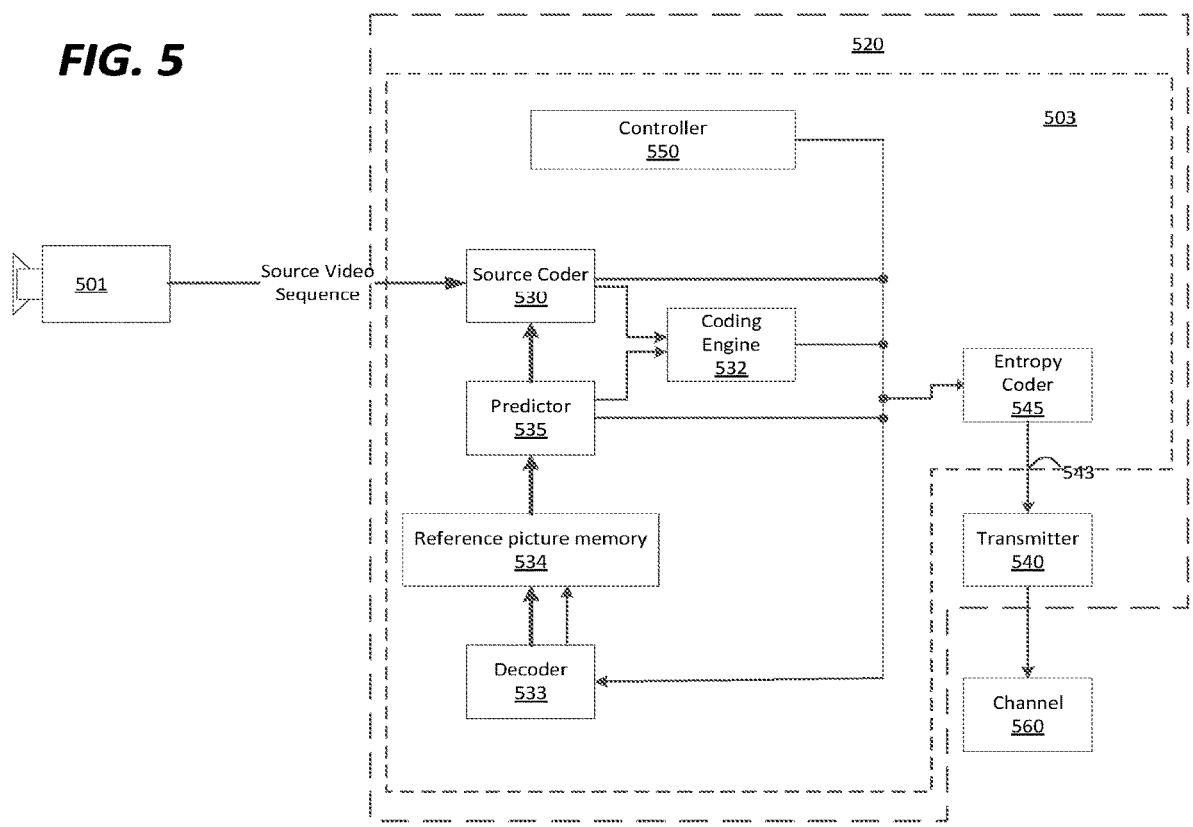
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501)(that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/ SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 6:
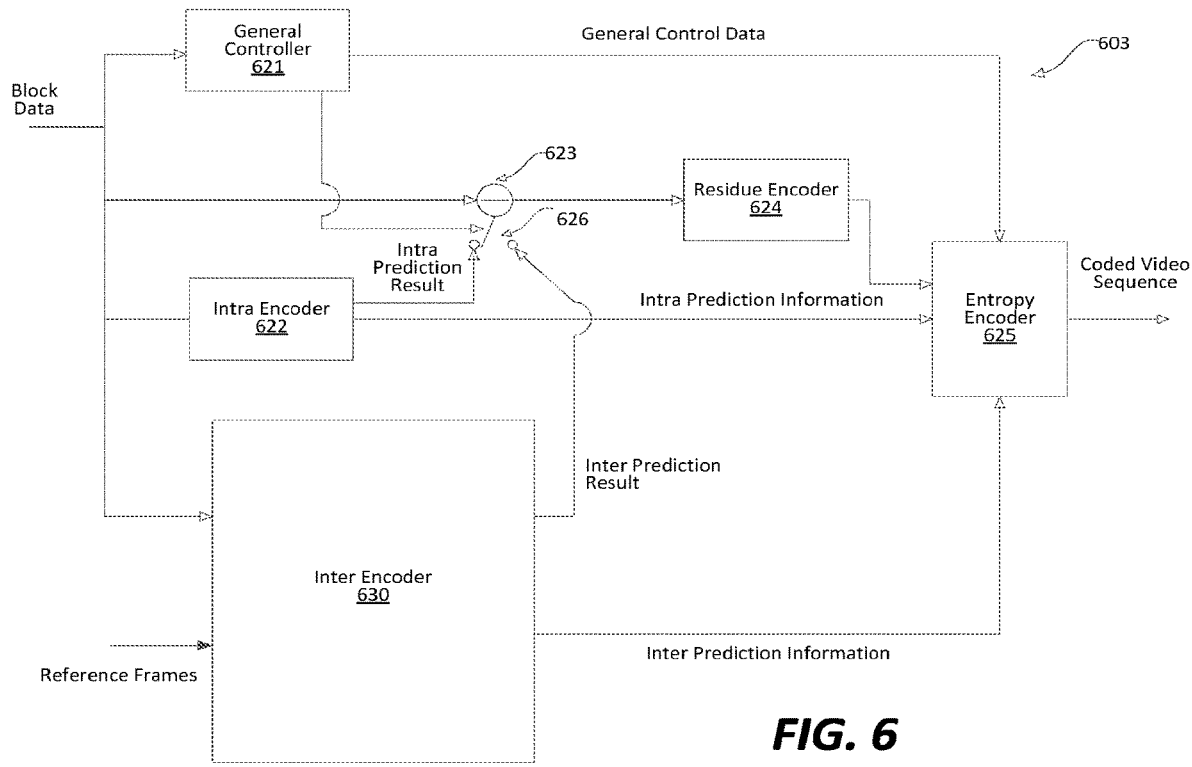
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction sub-mode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (622) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (621) is configured to determine general control data and control other components of the video encoder (603) based on the general control data. In an example, the general controller (621) determines the mode of the block, and provides a control signal to the switch (626) based on the mode. For example, when the mode is the intra, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients.

The entropy encoder (625) is configured to format the bitstream to include the encoded block. The entropy encoder (625) is configured to include various information according to a suitable standard, such as HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge sub-mode of either inter mode or bi-prediction mode, there is no residue information.

Figure 7:
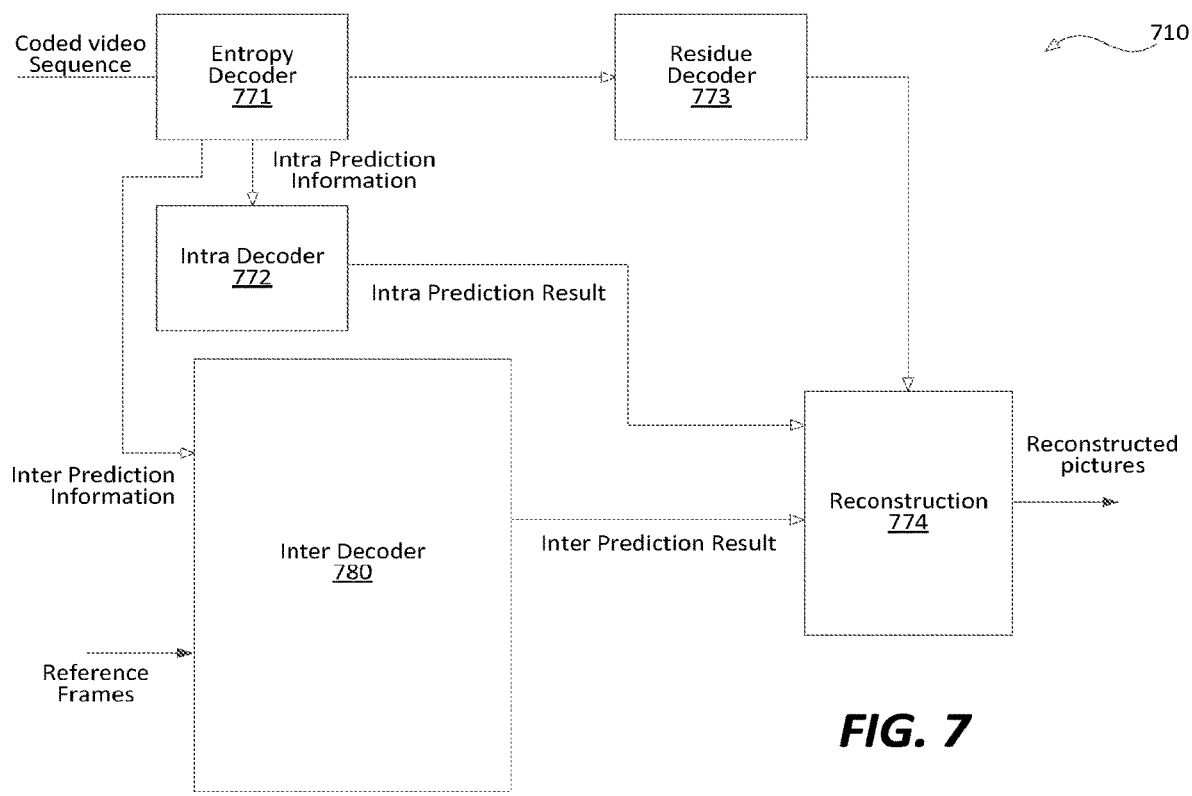
FIG. 7 shows a block diagram of a decoder in accordance with another embodiment.

FIG. 7 shows a diagram of a video decoder (710) according to another embodiment of the disclosure. The video decoder (710) is configured to receive a coded pictures that are part of a coded video sequence, and decode the coded picture to generate a reconstructed picture. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge sub-mode or another sub-mode), prediction information (such as, for example, intra prediction information or inter prediction information) that can identify certain sample or metadata that is used for prediction by the intra decoder (772) or the inter decoder (780) respectively residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter QP), and that information may be provided by the entropy decoder (771) (datapath not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503) and (603), and the video decoders (310), (410) and (710) can be implemented using any suitable technique. In an embodiment, the video encoders (303), (503) and (603), and the video decoders (310), (410) and (710) can be implemented using one or more integrated circuits. In another embodiment, the video encoders (303), (503) and (503), and the video decoders (310), (410) and (710) can be implemented using one or more processors that execute software instructions.

I. Related Merge Mode Technologies

I. 1 Merge Mode in HEVC

A picture can be partitioned into blocks, for example, using a tree structure based partition scheme. The resulting blocks can then be processed with different processing modes, such as intra prediction mode, inter prediction mode, merge mode, skip mode, and the like. When a currently being processed block, referred to as a current block, is processed with a merge mode, a neighbor block can be selected from a spatial or temporal neighborhood of the current block. The current block can be merged with the selected neighbor block by sharing a same set of motion data from the selected neighbor block. This merge mode operation can be performed over a group of neighbor blocks, such that a region of neighbor blocks can be merged together and share a same set of motion data. During transmission from an encoder to a decoder, only an index indicating the motion data of the selected neighbor block can be transmitted for the current block, instead of transmission of a whole set of motion date. In this way, an amount of data (bits) that are used for transmission of motion information can be reduced, and coding efficiency can be improved.

In the above example, the neighbor block, which provides the motion data, can be selected from a set of candidate positions predefined with respect to the current block. For example, the candidate positions can include spatial candidate positions and temporal candidate positions. Each spatial candidate position is associated with a spatial neighbor block neighboring the current block. Each temporal candidate position is associated with a temporal neighbor block that is a collocated block of the current block located at a previously coded picture. Neighbor blocks overlapping the candidate positions (referred to as candidate blocks) are a subset of all spatial neighbor blocks of the current block and all temporal neighbor blocks of the current block. In this way, the candidate blocks can be evaluated for selection of a to-be-merged block instead of the whole set of neighbor blocks.

Figure 8:
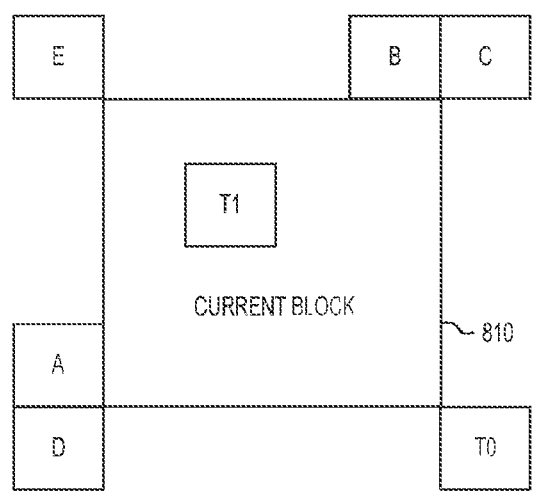
FIG. 8 shows merge mode candidate positions as defined in HEVC.

FIG. 8 shows merge mode candidate positions as defined in HEVC. A current block (810) is to be processed with merge mode. A set of candidate positions {A, B, C, D, E, T0, T1} are defined for the merge mode processing. Specifically, candidate positions {A, B, C, D, E} are spatial candidate positions that represent positions of candidate blocks that are in the same picture as the current block (810). In contrast, candidate positions {T0, T1} are temporal candidate positions that represent positions of candidate blocks that are in a previously coded picture. As shown, the candidate position T1 can be located near a center of the current block (810).

In FIG. 8, each candidate position is represented by a block of samples, for example, having a size of 4×4 samples. A size of such a block corresponding to a candidate position can be equal to or smaller than a minimum allowable size of prediction blocks (PBs) (e.g., 4×4 samples) defined for a tree-based partitioning scheme used for generating the current block (810). Under such configuration, a block representing a candidate position can always be covered within a single neighbor PB. In alternative example, a sample position (e.g., a bottom-right sample within the block A, or a top-right sample within the block D) may be used to represent a candidate position.

In one example, based on the candidate positions {A, B, C, D, E, T0, T1} defined in FIG. 8, a merge mode process can be performed to select merge candidates from the candidate positions {A, B, C, D, E, T0, T1}. In the merge mode process, a candidate list construction process can be performed to construct a candidate list. The candidate list can have a predefined maximum number of merge candidates, Cm. Each merge candidate in the candidate list can be a set of motion data that can be used for motion-compensated prediction.

The merge candidates can be listed on the candidate list according to a certain order. For example, depending on how the merge candidate is derived, different merge candidates may have different probabilities of being selected. The merge candidates having higher probabilities of being selected are positioned in front of the merge candidates having lower probabilities of being selected. Based on such an order, each merge candidate is associated with an index (referred to as a merge index). A merge candidate having a higher probability of being selected will have a smaller index value which means fewer bits are needed for coding the respective index.

In one example, the motion data, also referred to as motion parameters, can include horizontal and vertical motion vector displacement values of one or two motion vectors, one or two reference picture indexes associated with the one or two motion vectors, and optionally an identification of which reference picture list is associated with each index.

In an example, according to a predefined order, a first number of merge candidate, C1, is derived from the spatial candidate positions {A, B, C, D, E}, and a second number of merge candidate, C2=Cm−C1, is derived from the temporal candidate positions {T0, T1}. The numerals A, B, C, D, E, T0, T1 for representing candidate positions can also be used to refer to merge candidates. For example, a merge candidate obtained from candidate position A is referred to as the merge candidate A.

In some scenarios, a merge candidate at a candidate position may be unavailable. For example, a candidate block at a candidate position can be intra-predicted, or a candidate block is outside of a slice or tile including the current block (810) or is not in a same coding tree block (CTB) row as the current block (810). In some scenarios, a merge candidate at a candidate position may be redundant. For example, a same neighbor block of the current block (810) can overlap with two candidate positions. The redundant merge candidate can be removed from the candidate list. When a total number of available merge candidates in the candidate list is smaller than the maximum number of merge candidate C, additional merge candidates can be generated (for example, according to a preconfigured rule) to fill the candidate list such that the candidate list can be maintained to have a fixed length. For example, additional merge candidates can include combined bi-predictive candidates and zero motion vector candidates.

After the candidate list is constructed, at an encoder, an evaluation process can be performed to select a merge candidate from the candidate list. For example, rate-distortion performance corresponding to each merge candidate can be calculated, and the one with the best rate-distorting performance can be selected. Accordingly, a merge index associated with the selected merge candidate can be determined for the current block (810) and signaled to a decoder.

At a decoder, the merge index of the current block (810) can be received. A similar candidate list construction process, as described above, can be performed to generate a candidate list the same as that at the encoder side. After the candidate list is constructed, a merge candidate can be selected from the candidate list based on the received merge index without performing any evaluations in some examples. Motion data of the selected merge candidate can be used for subsequent motion-compensated prediction of the current block (810).

A skip mode is also introduced in HEVC. For example, in skip mode, a current block can be predicted using a merge mode similarly as described above to determine a set of motion data, however, no residue is generated, and no transform coefficients are transmitted. A skip flag can be associated with the current block. The skip flag and a merge index indicating the related motion information of the current block can be signaled to a video decoder. For example, at the beginning of a coding unit (CU) in an inter-picture prediction slice, a slip flag can be signaled that implies the following: the CU only contains one PU (2N×2N); the merge mode is used to derive the motion data; no residual data is present in the bitstream. At the decoder side, based on the skip flag, a prediction block can be determined based on the merge index for decoding a respective current block without adding residue signals. Thus, various methods for video coding with merge mode disclosed herein can be utilized in combination with a skip mode.

I. 2 Merge Mode in Joint Exploration Model 7 (JEM 7)

Joint Exploration Model 7 (JEM 7) is test model software developed by Joint Video Exploration Team (WET). In JEM 7, sub-CU modes and sub-CU merge candidates are introduced. The sub-CU modes include an alternative temporal motion vector prediction (ATMVP) mode and a spatial-temporal motion vector prediction (STMVP) mode. The sub-CU modes are enabled to obtain additional merge candidates. No additional syntax element is used to signal the sub-CU modes. Two additional sub-CU merge candidates (an ATMVP candidate and a STMVP candidate) can be derived and added to a merge candidate list of each CU to represent the ATMVP mode and STMVP mode. Compared with a candidate list of HEVC, up to seven merge candidates are used, if a sequence parameter set indicates that ATMVP and STMVP are enabled.

The encoding logic of the additional merge candidates (ATMVP and STMVP) is similar to that of the merge candidates in the HEVC. For example, for each CU in a P or B slice, two more rate distortion performance based checks are needed for the two additional sub-CU merge candidates. In one example, merge candidates are inserted or added to a candidate list according to the following order: spatial merge candidates (e.g., candidates A, B, C, and D), sub-CU merge candidates (e.g., candidates ATMVP, and STMVP), candidate E (when the merge candidates in the list are less than 6), temporal merge candidate (TMVP), combined bi-predictive candidates and zero motion vector candidates. In one example, given a length of a candidate list (e.g., 7), when available merge candidates with higher priorities based on the above order cannot fully fill the candidate list, merge candidates with lower priorities can be used to fill the candidate list.

In the JEM, all bins of a merge index are context coded by Context-Based Adaptive Binary Arithmetic Coding (CABAC). While in HEVC, only the first bin is context coded and the remaining bins are context by-pass coded. In the JEM, the maximum number of merge candidates is 7. A description of JEM 7 is provided in Algorithm Description of Joint Exploration Test Model 7 (JEM 7), Joint Video Exploration Team (JVET) of ITU-T SG 16 WP 3 and ISO/IEC JTC 1/SC 29/WG 11, 7th Meeting: Torino, IT, 13-21 Jul. 2017.

I. 3. An Exemplary Scheme for Merge Candidate List Construction

Figure 9:
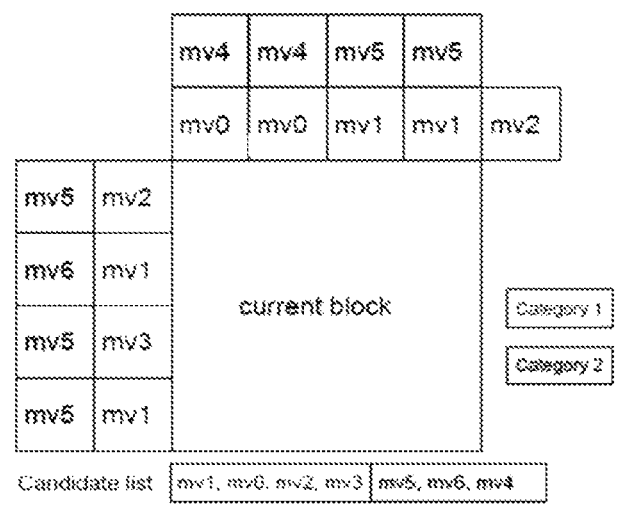
FIG. 9 shows an example scheme for merge candidate list construction.

FIG. 9 shows an exemplary scheme for merge candidate list construction. The example is described in "A dynamic motion vector referencing scheme for video coding", Jingning Han, Yaowu Xu, and James Bankoski, September 2016, ICIP. The scheme searches candidate motion vectors from previously coded blocks, with a step size of 8×8 samples block. The scheme defines the nearest spatial neighbors, i.e., immediate top row, left column, and top-right corner, as category 1. The outer regions (maximum three 8×8 blocks away from the current block boundary) and the collocated blocks in the previously coded picture are classified as category 2. The neighbor blocks that are predicted from different reference pictures or are intra coded are pruned from the list. The remaining reference blocks are then each assigned a weight. The weight is related to the distance to the current block.

II. Merge Candidate List Construction Examples

Figure 10:
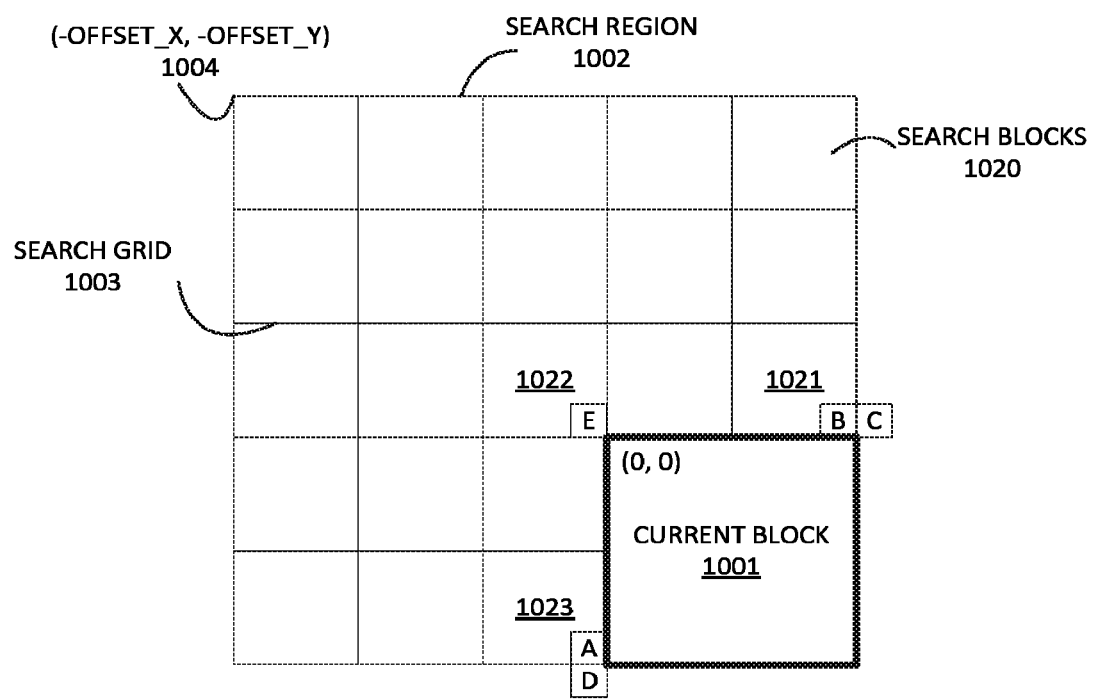
FIGS. 10-16 illustrate examples of methods of searching for merge candidates according to embodiments of the disclosure.

II. 1. Obtaining Merge Candidates from a Search Region Including Search Blocks That Are Not Immediately Adjacent to the Current Block II. 1.1. First Example FIG. 10 illustrates a first example of searching for merge candidates. In the example, the merge candidates can be searched for from a search region 1002 adjacent to a current block (1001). The search region includes search blocks (1020) that are not located immediately on the top of, or to the left of the current block (1001) as well as search blocks (1020) that are immediate neighbor blocks of the current block (1001), such as search blocks (1021-1023). In other words, a subset of the search blocks (1020) can be located at positions (one search block) away from the current block (1001). Compared with the candidate position specification in HEVC, the search region (1002) is extended from the immediate neighborhood of the current block (1101) to neighborhood away from the current block (1101). In this way, more merge candidates can be obtained from the extended search region (1102). A probability of obtaining a better merge candidate can be increased.

As shown, the search region (1002) can be square or rectangular with the current block (1001) positioned at the bottom-right corner of the search region (1002). A coordinate system with y axis pointing downwards and x axis pointing rightwards can be employed for defining the search region. For example, the top-left corner (sample) coordinates of the current block (1001) is set to be (0, 0). The search region (1002) can be specified with a pair of coordinates of a top-left corner sample (1004) of the search region (1002), such as (−Offset_x, −Offset_y).

The search region (1002) can be partitioned into the search blocks (1020) according to a grid pattern (1003). The grid pattern (1003) may vary in different examples. Similarly, a size and shape of each search block (1020) may vary in different examples. For example, each search block (1020) can be square or rectangle in shape. For example, square blocks may have a size of K×K, where K can be an integer, such as 4, 8, 16, and the like.

Each search block (1020) can represent a candidate position from which a merge candidate can be obtained. For example, a position corresponding to a sample within the respective search block can be used as a candidate position for obtaining respective motion data. In one example, the specific candidate position within the respective search block is predefined such that a common understanding can be established at encoder side and decoder side. For example, the candidate position can be located at a position of a top-left corner sample, a bottom-right corner sample, or a central sample within the respective search block. As shown in FIG. 10 example, three search blocks 1021-1023 overlap the candidate positions B, E, and A as specified in HEVC.

Merge candidates can be searched for from the search bocks (1020) according to a certain order. In one method, the searching of the search blocks can start from (−Offset_x, −Offset_y) to the edge of the current block (1001). An encoder or decoder searches from the (−Offset_x, −Offset_y), and every K×K block can be scanned to get the merge candidates until the edge of the current block (1001). When a merge candidate is available at that position (search block), that merge candidates can be inserted into the merge candidates list. When the merge candidate is not available at the position, that search block is skipped without insertion operation.

II. 1.2. Second Example

Figure 11:
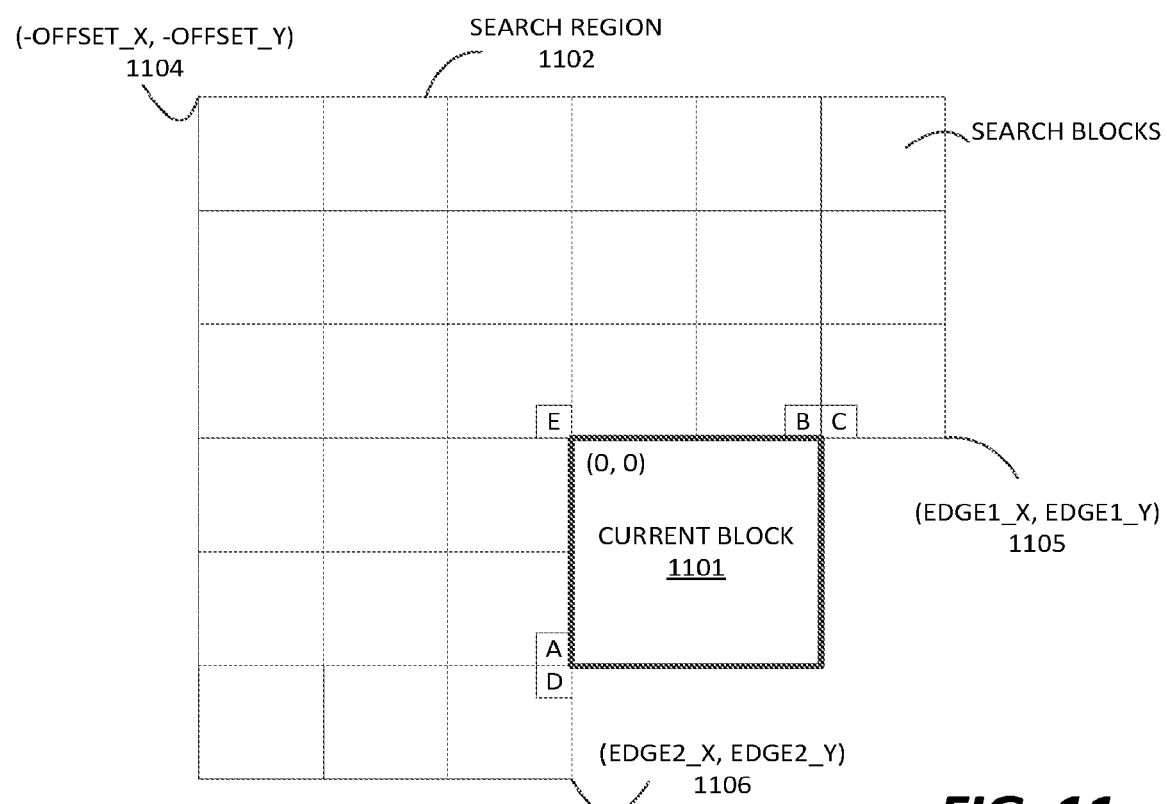

FIG. 11 shows another example of searching for merge candidates. As shown, a search region (1102) is similarly defined at the neighborhood of a current block (1101) as the FIG. 10 example. However, the bottom or right edge of the search region (1102) is not aligned with the bottom or right edge of the current block (1101). Accordingly, in addition to a first pair of coordinates (−Offset_x, −Offset_y) at position (1104), a second pair of coordinates (Edge1_x, Edge1_y) at position 1105 and a third pair of coordinates (Edge2_x, Edge2_y) at position (1106) are used to define the search region (1102).

II. 1.3. Third Example

Figure 12:
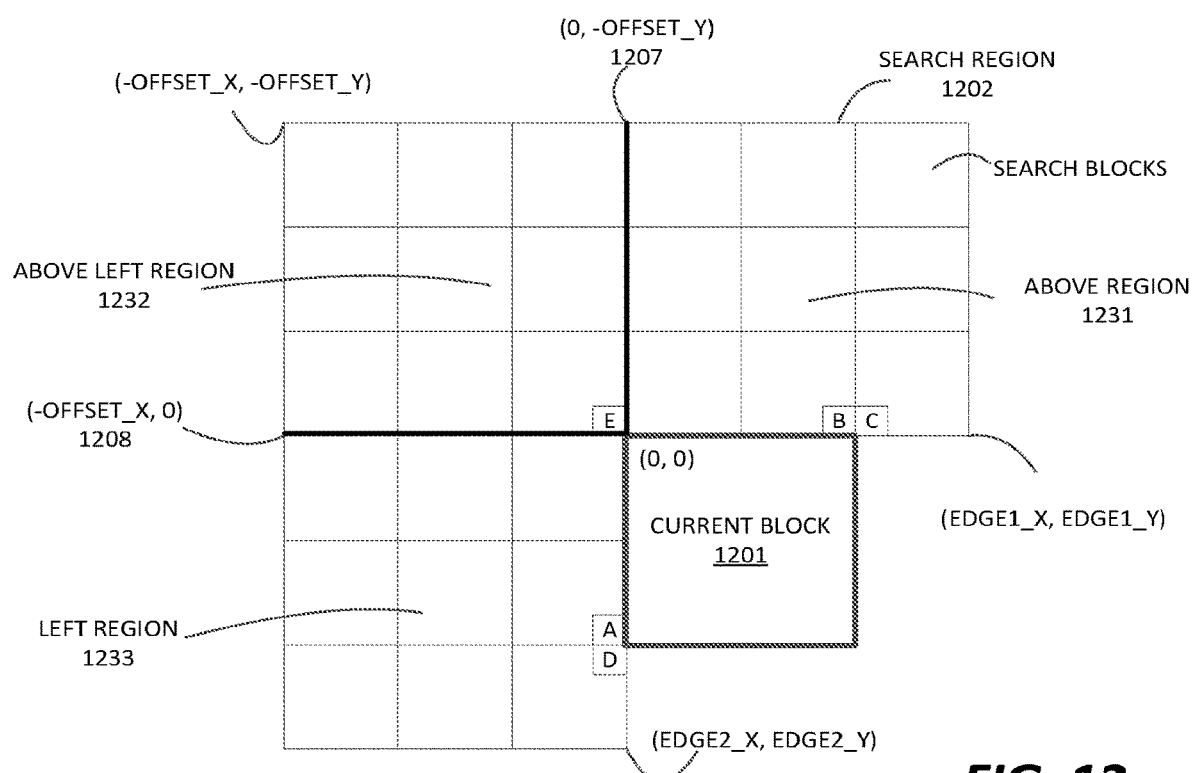

FIG. 12 shows another example of searching for merge candidates. As shown, a search region (1202) is similarly defined at the neighborhood of a current block (1201) as in the FIG. 11 example. However, the search region (1201) is partitioned into three sub-regions: above region (1231), above-left region (1232), and left region (1233). Specifically, the above region and the above-left region are separated by a line aligned with the left edge of the current block 1201 and crossing the coordinates (0, −Offset_y) at position (1207). The left region and the above-left region are separated by a line aligned with the top edge of the current block 1201 and crossing the coordinates (−Offset_x, 0) at position (1208).

Different search orders may be adopted based on the above sub-region partition. For example, the search for merge candidates may be performed in one of the following order: (1) above region, left region, above-left region; (2) above region, above-left region, left region; (3) left region, above region, above-left region; (4) left region, above-left region, above region; (5) above-left region, above region, left region; and (6) above-left region, left region, above region.

Within each sub-region, the search blocks can similarly be searched in various orders, such as from left column to right column and from top row to bottom row, from bottom row to top row and from right column to left column, and other suitable orders. In addition, the search orders may be different from different sub-regions. For example, the search may start from search blocks near the current block (1201) and proceed to search blocks away from the current block (1201) in each sub-region. Alternatively, the search may start from search blocks away from the current block (1201) and proceed to search blocks near the current block (1201) in each sub-region.

II. 1.4. Fourth Example

Figure 13:
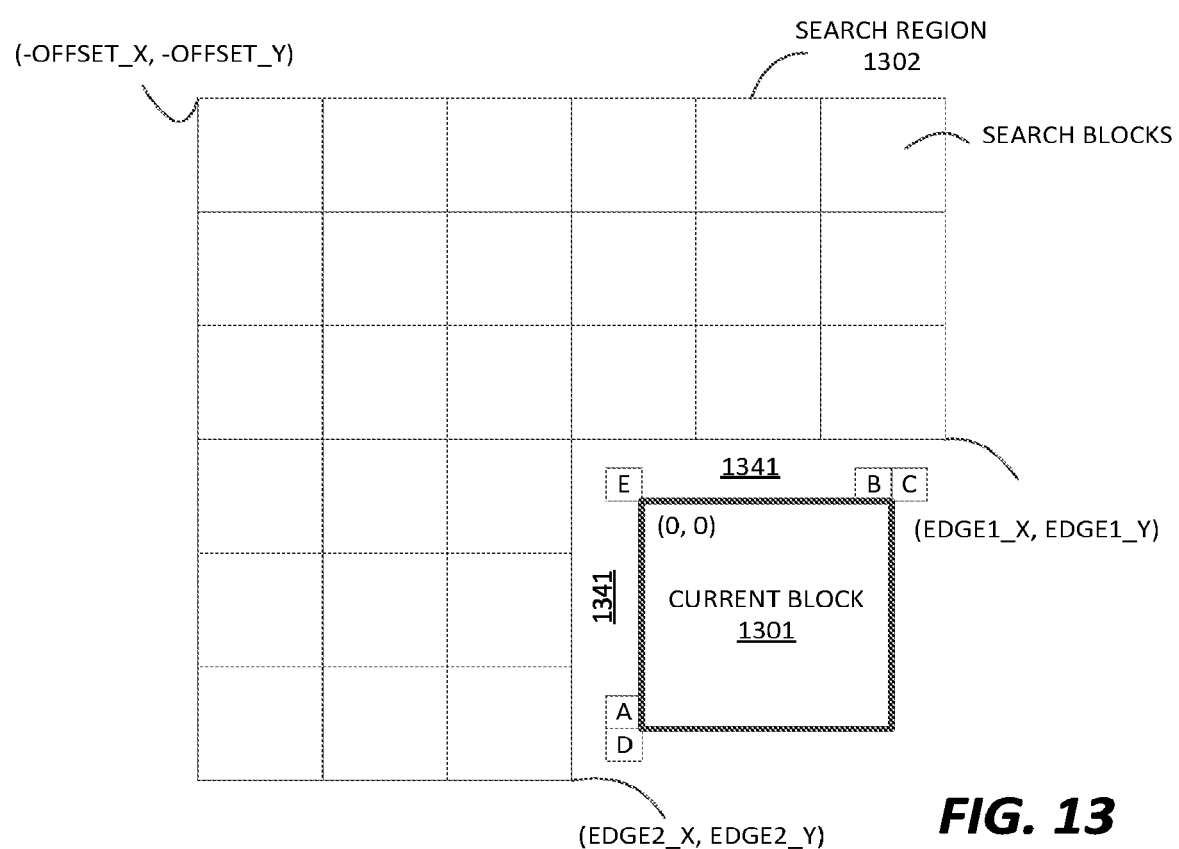

FIG. 13 shows another example of searching for merge candidates. As shown, a search region (1302) adjacent to a current block (1301) is similarly defined at the neighborhood of the current block (1301) as in the FIG. 11 example. However, different from the FIG. 11 example, the search region (1302) is shifted away from the current block (1301). For example, a gap 1341 can exist between the search region (1302) and the current block (1301) at a top side, a left side, or both of the current block (1301).

II. 1.5. Fifth Example

Figure 14:
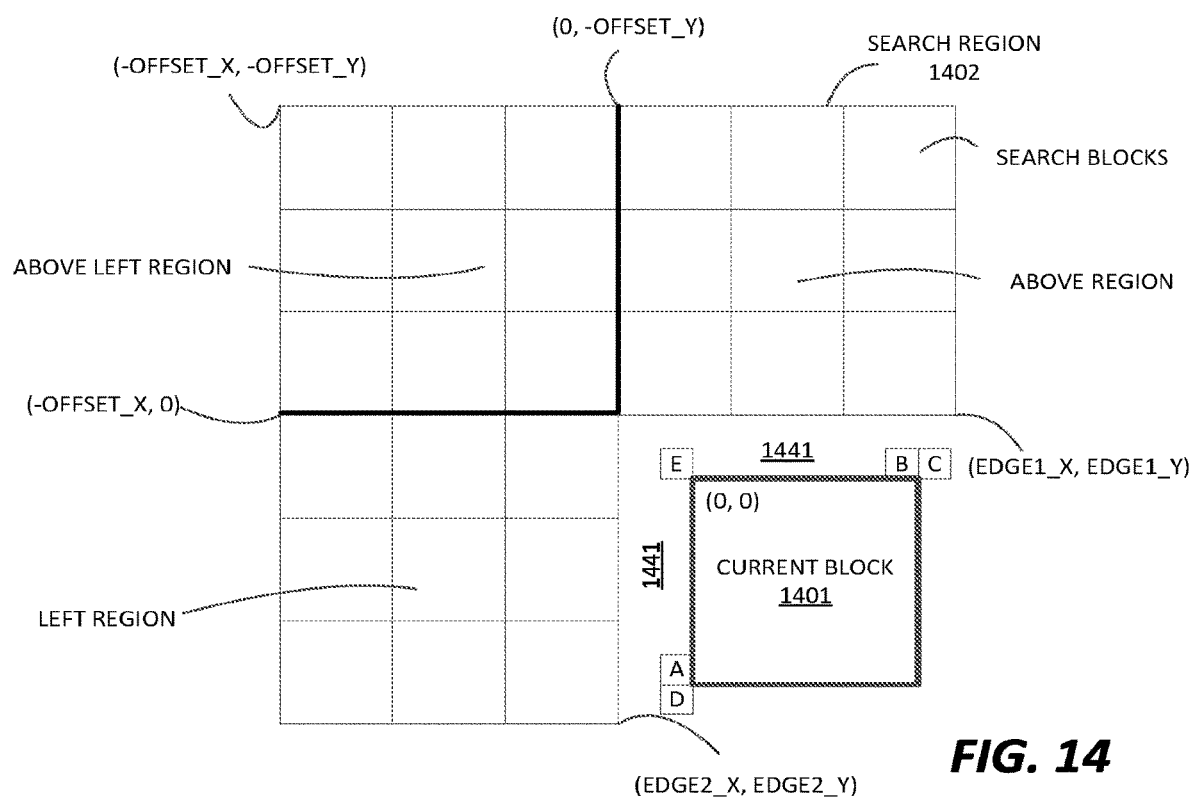

FIG. 14 shows another example of searching for merge candidates. As shown, a search region (1402) adjacent to a current block (1401) is similarly defined at the neighborhood of the current block (1401) as the FIG. 12 example. However, different from the FIG. 12 example, the search region (1402) is shifted away from the current block (1401). For example, a gap 1441 can exist between the search region (1402) and the current block (1401) at a top side, a left side, or both of the current block (1401).

II. 1.6. Sixth Example

In another example, searching for merged candidates can be performed with two rounds until a merge candidate list is fully filled. For example, a first grid pattern is used in the first round, and has a size of 2K×2K (meaning that search blocks resulting from the first grid pattern have a size of 2K×2K). A first search region adjacent to the current block is partitioned into first search blocks using the first grid pattern. A second grid pattern is used in the second round. The second grid pattern can be similar to the first grid pattern. However, a second search region corresponding to the second grid pattern is shifted away from the position of the first search region, for example, to the upper-left direction with respect to the current block by a block of K×K. The first and second rounds of search can be performed over the first and second search regions, respectively and successively. By this two rounds of search, density of candidate positions corresponding to respective search blocks can be increased.

II. 1.7. Seventh Example

Figure 15:
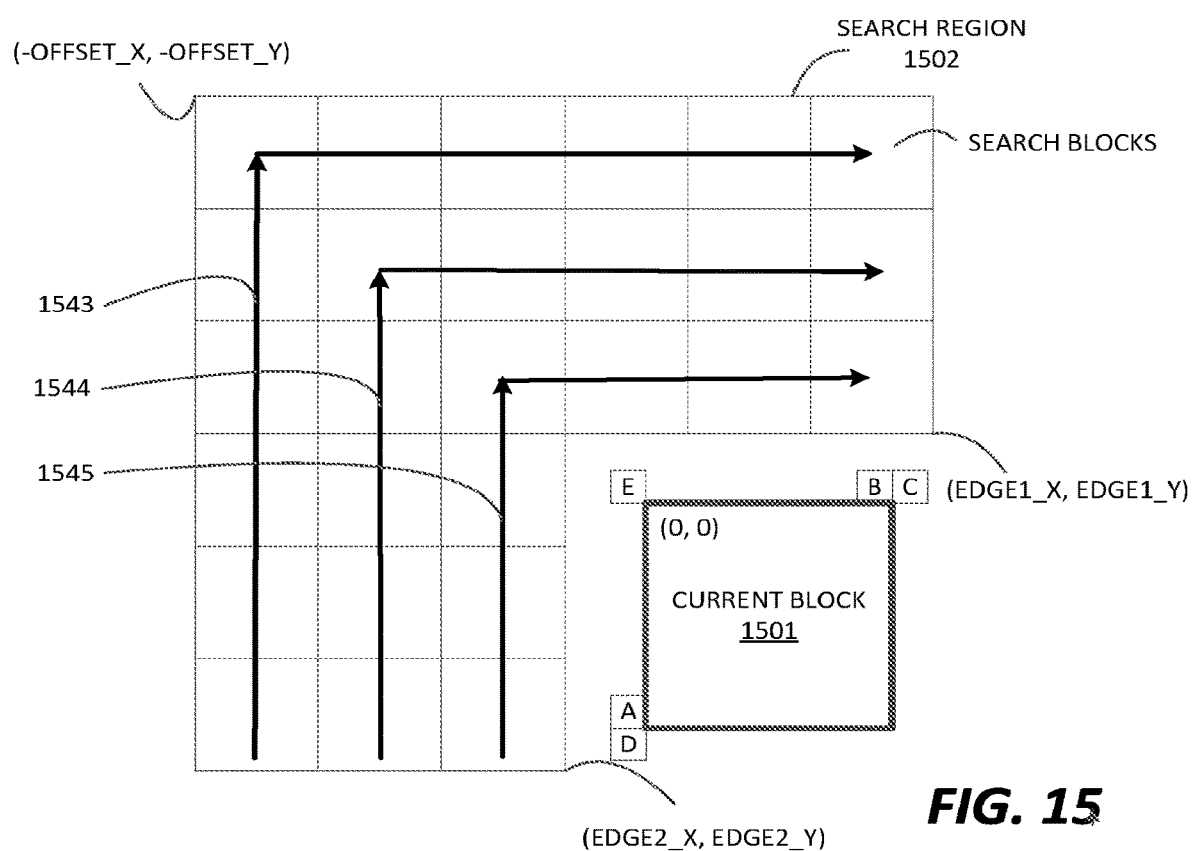

FIG. 15 shows another method of searching for merge candidates. As shown, a search region (1502) adjacent to a current block (1501) is defined. The search region (1502) can be in touch with the current block (1501), or can be shifted away from the current block (1501) in various examples. A searching pattern is defined for searching search blocks of the search region (1502). The searching pattern can include multiple strips (1543-1545) indicated by arrows (1543-1545). As shown, each strip has an L shape surrounding the current block (1501). In different examples, a subset of blocks or all blocks of each L-shaped strip can be searched.

In one example, the L-shaped strips (1543-1545) can be searched in an order from left bottom to top right, and from nearest neighborhood to the furthest neighborhood, as shown in FIG. 15. The arrows (1543-1545) crossing the search blocks represent the directions of the scanning in each strip.

In another example, the L-shaped strips (1543-1545) can be searched in an order from right top to left bottom, and from nearest neighborhood to furthest neighborhood.

In another example, the L-shaped strips (1543-1545) can be searched in an order from left bottom to right top, and from furthest neighborhood to nearest neighborhood.

In another example, the L-shaped strips (1543-1545) can be searched in an order from right top to left bottom, and from furthest neighborhood to nearest neighborhood.

II. 1.8. Eighth Example

Figure 16:
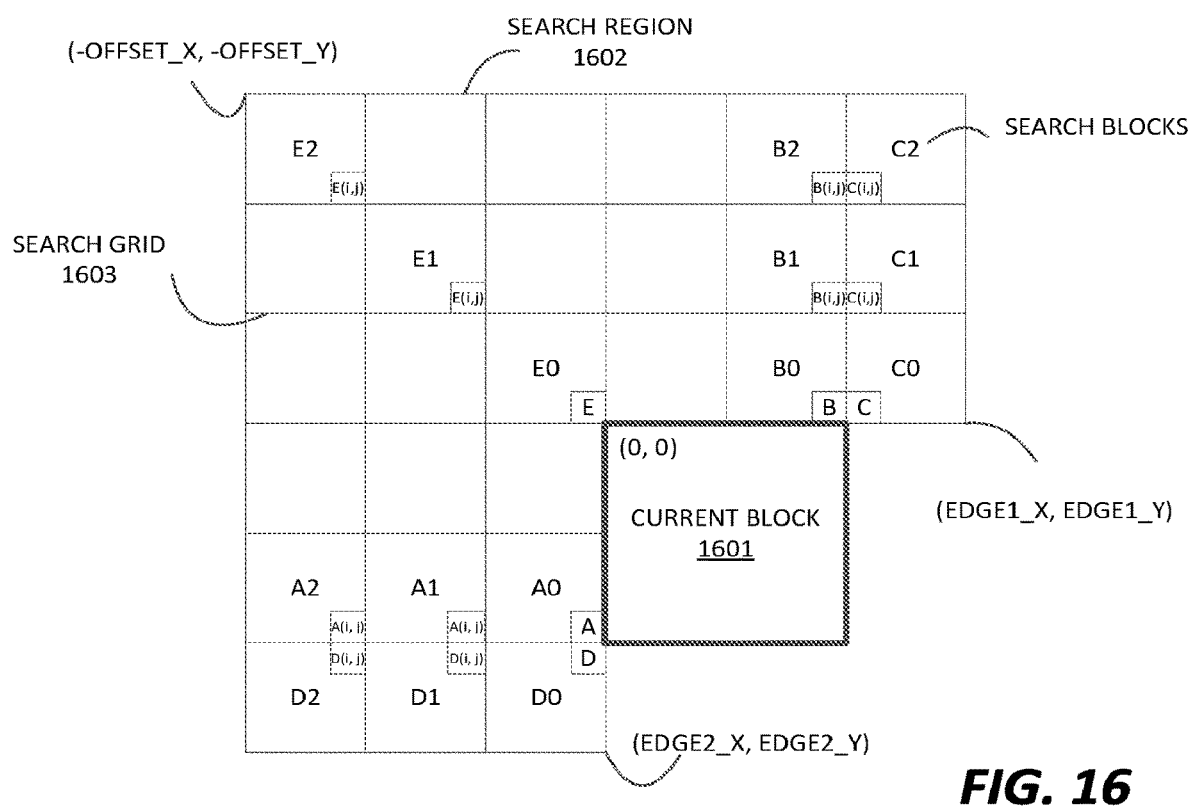

FIG. 16 shows another example for searching for merge candidates. A search method illustrated in FIG. 16 can be an extension to the methods specified by JVET and HEVC. As shown, a search region (1602) adjacent to a current block (1601) is defined, for example, with three pairs of coordinates (−Offset_x, −Offset_y), (Edge1_x, Edge1_y), and (Edge2_x, Edge2_y) with respect to a top-left corner sample (0, 0) of the current block (1601). The search region (1602) may be immediately adjacent to the current block (1602). The search region (1602) is partitioned into search blocks using a grid pattern (1603). The resulting search blocks may have a shape of a square or a rectangle.

In HEVC or JEM 7, spatial merge candidates can be searched at a first set of candidate positions A-E within a first set of search blocks A0, B0, C0, D0, and E0 as shown in FIG. 16. By the extension, additional sets of candidate positions can be introduced to cover the search region (1602) which is extended from the immediate neighborhood of the current block 1601. Specifically, the candidate positions in the search region (1602) are extended, left-wards, top-wards and left-top-wards with respect to the first set of candidate positions A-E at the left, top and left-top of the current block (1601), respectively, from a first neighborhood (including A0-C0) adjacent to the current block (1602) to neighborhoods (including A1-C1 and A2-C2) that are non-adjacent to the current block (1602), and are a search block away from the current block (1602). Among the additional sets of candidate positions, a second set of candidate positions can be within a second set of search blocks A1, B1, C1, D1, and E1, and a third set of candidate positions can be within a third set of search blocks A2, B2, C2, D2, and E2. While two additional sets of candidate positions (or search blocks) are shown in FIG. 16, more than two sets of additional sets of candidate positions (or search blocks) may be employed in other examples depending on the definition of the search region (1602) and the grid pattern (1603).

As shown, in the first set of search blocks, search block (D0) is located at a bottom-left corner of the current block (1601); search block (A0) is located at a left side of the current block and next to the search block (D0); search block (C0) is located at a top-right corner of the current block; search block (B0) is located at top side of the current block and next to the search block (C0); and search block (E0) is located at a top-left corner of the current block.

As shown, in the second set of search blocks, search block (D1) is located next to a left side of the search block (D0);

search block (A1) is located next to a left side of the search block (A0); search block (C1) is located next to a top side of the search block (C0); search block (B1) is located next to a top side of the search block (B0); and search block (E1) is located at a top-left corner of the search block (E0).

Each search block can have a size of W×H samples. When searching a search block, a position of a sample at a location within the search block can be used as a candidate position to obtain motion data. The position of the sample can be, for example, a top-left corner sample, a bottom-right corner sample, a sample at the center of the respective search block, and the like.

As an example, as shown in FIG. 16, candidate positions A-E are represented by small blocks of a size of 4×4 samples. Candidate positions in other to-be-search search blocks A0-E0, A1-E1, and A2-E2 can also be similarly represented by small blocks indicated by A (i, j), B (i, j), C (i, j), D (i, j), and E (i, j), where i and j are coordinates corresponding to a sample within the small blocks.

Based on the above defined search region (1602), and the specified search blocks or candidate positions, various scan (search) orders may be used for searching for merge candidates. In one example, the scan order can be from nearest neighborhood to the furthest neighborhood. For example, search blocks A0-E0 are first searched followed by search blocks A1-E1, and further followed by A2-E2. In one example, the scan order can be the reverse of the above example. In addition, the scan order within each set of search blocks A0-E0, A1-E1, and A2-E2 can vary in different examples. For example, the scan order may be A (i, j), B (i, j), C (i, j), D (i, j), E (i, j), or A (i, j), D (i, j), B (i, j), C (i, j), E (i, j), or other orders.

In one example, the search over the search region 1602 is performed in multiple rounds. For example, the multiple rounds of search can be performed from the nearest neighborhood of the current block 1601 that includes search blocks A0-C0 to the furthest neighborhood of the current block 1601 that includes search blocks A2-D2.

The multiple rounds of search can continue until a respective candidate list is fully filled. For example, after a previous round of search is performed, it is determined whether the respective candidate list is fully filled. When the candidate list is not fully filled, a next round of search will be performed. Otherwise, the process of the multiple rounds of search will be terminated. During each round of search, when a merge candidate is found available and is to be added to the respective candidate list, a pruning operation may take place. For example, if the to-be-added merge candidate is the same as or similar to (e.g., based on a threshold) a candidate already on the candidate list, the to-be-added merge candidate may not be added to the candidate list. In addition, in one example, during a round of search, when it is found that the candidate list is fully filled, the round of search may be terminated before all merge candidate positions corresponding to the round of search are searched.

In one example, the above described schemes of the search region, the search blocks, the candidate positions, and the scan orders can also be applied for searching for temporal merge candidates (TMVP merge candidates) within respective search blocks when the TMVP candidates are available in temporal neighbor blocks.

Further, in the above methods, Offset_x, −Offset_y, Edge1_x, Edge1_y, Edge2_x, Edge2_y coordinates may be signaled from an encoder side to a decoder side, or can be predefined.

II. 1.9. Example Search Methods with Dynamic Search Configurations

In some examples, a search grid pattern can be dynamically defined. In one method, a search block size depends on respective search block positions. For example, in different sub-regions within a search region, search block sizes can be different. For example, in FIG. 12 example, the left side sub-region (1233) with respect to the current block (1201) can have a larger search block size, grid_large, and the above side sub-region (1231) can have a smaller search block size, grid_small. In another example, the left side sub-region (1233) can have a smaller search block size, grid_small, and the above side sub-region (1231) can have a large search block size, grid_large.

In another method, the search block size depends on a current block size. For example, when the current block size is greater than a threshold, the search block size is a larger one, grid_large. When the current block size is smaller than a threshold, the search block size is a smaller one, grid_small. Generally, a picture under processing is partitioned into coding blocks adaptively according to local characteristics of the picture. Thus, an area with detailed textures may be partitioned into blocks with smaller sizes, while an area with fewer textures may be partitioned into blocks with larger sizes. As a result, a smaller block would have a higher probability to be surrounded with samller blocks, while a large block would have a higher probability to be surrounded with larger blocks. Accordingly, given a search region adjacent to a current block, motion data from neighbor blocks of a smaller current block may have a higher density than motion data from neighbor blocks of a larger current block. Corresponding to this motion data distribution property, adjust the search block size according to the size of the current block would improve the efficiency of merge candidate search.

In another embodiment, when the current block size is greater than a threshold, the search block size is a smaller one, grid_small. When the current block size is smaller than a threshold, the search block size is a large one, grid_large.

In another method, the search block size depends on a temporal level of the current slice. For example, when the current temporal level is greater than a threshold which may be signaled or predefined, the search blocks of the current block can have a large value, grid_large. When the current temporal level is smaller than a threshold which may be predefined or signaled, the search blocks of the current block can have a small value, grid_small.

In another embodiment, when the current temporal level is greater than a threshold, the search blocks of the current block can have a small value, grid_small. When the current temporal level is smaller than a threshold, the search blocks of the current block can have a large value, grid_large.

In another method, the search block size depends on the first N merge candidates that are already included in the merge candidates list. When most of the merge candidates have are similar to each other, such as an average/maximal difference among motion vectors of merge candidates is smaller than a threshold, the search block size can be a large value, grid_large. The top left corner coordinates of the search range can be (−offset_large, −offset large). When most of the merge candidates are not similar, such as the average/maximal difference among those motion vectors is bigger than a threshold, the search block size can be a small value, grid_small. The top left corner coordinates of the search range can be (−offset_small, −offset small). In this method, the candidates already in the list can be, spatial candidates A, B, C, D, E and temporal candidates TMVP, or only spatial candidates A, D, C, D E, or all the candidates already in the list.

In another method, when most of the motion vectors of merge candidates already on the list have a similar value of motion vectors, such as the average/maximal difference among those motion vectors is smaller than a threshold, the search block size can be a small value, grid_small. The top left corner coordinates of the search range can be (-offset_small, -offset small). When most of the motion vectors of merge candidates on the list are not similar to each other, such as the average/maximal difference among motion vectors is bigger than a threshold, the search block size can be a large value, grid_large. The top left corner coordinates of the search range can be (-offset_large, -offset large). In this method, the candidates already on the list can be, spatial candidates A, B, C, D, E and temporal candidates TMVP, or only spatial candidates A, D, C, D E, or all the candidates already in the list.

In another method, search blocks partitioned with a searching grid pattern can be non-square.

In the above methods, Offset_x and offset_y can be either different or same. The searching range can be square or non-square.

In some examples, a search range (corresponding to a search region) can be dynamic. In one method, the searching range depends on search block positions. For example, a left side sub-region can have a larger searching range, offset_large, and an above sub-region can have a smaller search range, offset_small. The top left corner coordinates of the search range can be (-offset_large, -offset small). In another method, the left side sub-region can have a smaller search range, offset_small, and the above side sub-region can have a large search block size, offset_large. The top left corner coordinates of the search range can be (-offset_small, -offset large).

In another method, a search range depends on a current block size. When the current block size is greater than a threshold, the search range is a large one, offset_large. The top-left coordinates of the search range can be (-offset_large, -offset_large). When the current block size is smaller than a threshold, the search range is a small one, offset_small. The top left corner coordinates of the search range can be (-offset_small, -offset small).

In another embodiment, when the current block size is greater than a threshold, the search range is a smaller one, offset_small. The top left corner coordinates of the search range can be (-offset_small, -offset small). When the current block size is smaller than a threshold, the search rage is a large one, offset_large. The top left corner coordinates of the search range can be (-offset_large, -offset large).

In another method, a search range depends on a current temporal level. When the current temporal level is greater than a threshold, the search range of the current block can have a large value, offset_large. The top left corner coordinates of the search range can be (-offset_large, -offset large). When the current temporal level is smaller than a threshold, the search grid of the current block can have a small value, offset_small. The top left corner coordinates of the search range can be (-offset_small, -offset small).

In another embodiment, when the current temporal level is greater than a threshold, the search range of the current block can have a small value, offset_small. The top left corner coordinates of the search range can be (-offset_small, -offset small). When the current temporal level is smaller than a threshold, the search range of the current block can have a large value, offset_large. The top left corner coordinates of the search range can be (-offset_large, -offset large).

In another method, merge candidates already in a candidate list can be sorted. Then an encoder and decoder can find range bounds of MV candidates according to the existing merge candidates. In one example, MVmin-x, MVmin-y, MVmax-x, and MVmax-y are defined as follows, $$MVmin\text{-}x = \min(MVAx, MVBx, MVCx, MVDx, MVEx),$$

$$MVmin\text{-}y = \min(MVAy, MVBy, MVCy, MVDy, MVEy),$$

$$MVmax\text{-}x = \max(MVAx, MVBx, MVCx, MVDx, MVEx), \text{ and}$$

$$MVmax\text{-}y = \max(MVAy, MVBy, MVCy, MVDy, MVEy),$$

where MVA, MVB, MVC, MVD and MVE are scaled motion vector candidates at candidate positions A, B, C, D and E. The scaling is to scale the motion vectors from an original reference picture to a target reference picture such as a reference picture with reference index 0 in the current reference list. The scaling can be based on the same scaling method used in deriving a TMVP. Then, MVmin-x, MVmin-y, MVmax-x, and MVmax-y serve as the range bounds of existing candidates on the list.

Next, in a coordinate system in which MVs of the merge candidates are distributed, a MV search range is defined based on the range bounds of the existing candidates on the list. For example, in the horizontal direction, the MV search range is between MVmin-x and MVmax-x, while in the vertical direction, the MV search range is between MVmin-y and MVmax-y. The MV search range is partitioned into search blocks which may have a same size or different sizes at different sub-regions. For each search block, an index number is assigned, and a representative MV is defined. For example, the representative MV may be defined as the top-left corner vector value of the current search block. Encoder may check the MVs of all search blocks in the MV search range and find a best MV and signal the associated index to decoder. The signaling of the index can be the same as the signaling of a merge index.

II. 2. Positions of Merge Candidates on Merge Candidate List

Merge candidates resulting from the merge candidate search methods disclosed herein may include merge candidates at the candidate positions A, B, C, D, and E as described in FIG. 8 example because, for example, a search region may overlap the candidate positions A-E. Thus, merge candidates except the merge candidates available at the candidate positions A-E are referred to as extended merge candidates in order to distinguish from the candidate candidates at candidate positions A-E. In some examples, the extended merge candidates only include spatial merge candidates. In other examples, the extended merge candidates may include other types of merge candidates, such as temporal merge candidates (TMVP) in addition to spatial merge candidates. Various orders for adding the extended merge candidates to existing merge candidate list as specified in HEVC or JEM 7 are described below.

In one example, the extended merge candidates can be added to the back of the merge candidate list after all the existing merge candidates (e.g., spatial merge candidates (A, B, C, and D), sub-CU merge candidates (ATMVP, STMVP), spatial merge candidate (E) (when the merge candidates in the list are less than 6), temporal merge candidate (TMVP), combined bi-predictive candidates and zero motion vector candidates).

In another example, those extended merge candidates can be inserted after the spatial merge candidates. For example, the merge candidate order can be spatial merge candidates (A, B, C, and D), extended merge candidates, sub-CU merge candidates (ATMVP, STMVP), spatial merge candidate (E) (when the merge candidates in the list are less than 6), temporal merge candidate (TMVP), combined bi-predictive candidates and zero motion vector candidates.

In another example, those extended merge candidates can be inserted after the temporal merge candidate (TMVP). For example, the merge candidate order is can be spatial merge candidates (A, B, C, and D), sub-CU merge candidates (ATMVP, STMVP), spatial merge candidate (E) (when the merge candidates in the list are less than 6), temporal merge candidate (TMVP), extended merge candidates, combined bi-predictive candidates and zero motion vector candidates.

In another example, those extended merge candidates can be inserted after the TMVP, and the merge candidate at position E is always inserted when it is available. For example, the merge candidate order can be spatial merge candidates (A, B, C, and D), sub-CU merge candidates (ATMVP, STMVP), spatial merge candidate (E), temporal merge candidate (TMVP), extended merge candidates, combined bi-predictive candidates and zero motion vector candidates.

In another example, those extended merge candidates can be inserted after the STMVP. The merge candidates order can be spatial merge candidates (A, B, C, and D), sub-CU merge candidates (ATMVP, STMVP), extended merge candidates, spatial merge candidate (E) (when the merge candidates in the list are less than 6), temporal merge candidate (TMVP), combined bi-predictive candidates and zero motion vector candidates.

In another example, those extended merge candidates can be inserted after the ATMVP. The merge candidates order can be spatial merge candidates (A, B, C, and D), first sub-CU merge candidate (ATMVP), extended merge candidates, second sub-CU merge candidate (STMVP), spatial merge candidate (E) (when the merge candidates in the list are less than 6), temporal merge candidate (TMVP), combined bi-predictive candidates and zero motion vector candidates.

It is noted that the order of inserting extended merge candidates to a merge candidate list can have many varieties. The above examples are just a sub set of possibilities for construction a merge candidate list. Other methods for inserting the extended merge candidates can be similarly derived.

II. 3. Candidate List Pruning

When adding a merge candidate to a candidate list, a pruning operation can be performed to avoid adding a redundant merge candidate to the candidate list, or to avoid adding a similar merge candidate to the merge candidate list. In this way, more diverse merge candidate can be obtained when constructing the merge candidate list. A better merge candidate (e.g., in terms of rate distortion performance) can be selected from such a candidate list.

In one method, the pruning operation can be a lossless pruning operation. When inserting these extended merge candidates into a merge candidates list, an encoder or decoder can compare a new candidate with existing candidate already in the list. A new merge candidate different from any existing merge candidates in the list can be added to the list.

In another method, the pruning operation can be a lossy pruning operation. When inserting those extended merge candidates into a merge candidates list, an encoder or decoder will compare a new candidate with existing candidate already in the list. If the difference between the new candidate and the existing candidates is greater than a threshold, the encoder or decoder inserts the new candidate to the candidate list. For example, the difference can be an absolute value of a difference between a to-be-added motion vector and an existing motion vector based on vector operation. In one example, the threshold can be a positive integer (for example, 4, 8, 12, 16, and the like), and can be predefined (e.g. hard coded) or signaled at sequence parameter set (SPS) level, picture parameter set (PPS) level, or a slice header. The detailed signal at SPS or PPS is specified in the later part of this invention.

When motion data of a merge candidate is stored, a respective motion vector resolution can be ¼ pel precision or integer pel precision in HEVC. In JEM, a motion vector resolution can have additional 4 pel motion vector precision. When performing the pruning operation for adding extended merge candidates, the comparison can be under ¼ pel precision, integer precision, or 4 pel precision.

An example pruning process for comparing a new candidate vector with an existing candidate vector can include the following steps. First, whether the new and existing vectors are associated with a same reference picture index is first determined. If the new and existing vectors are not associated with a same reference picture index, they are determined to be different, and the new candidate vector can be added to the candidate list. Otherwise, a further step is performed to compare a difference of the new and existing vectors with a threshold. For example, a magnitude of the difference between the new and existing vectors may be derived and compared with the threshold. When the difference is above the threshold, the new vector may be added to the candidate list. Otherwise, the new vector is not added to the candidate list. When the threshold is selected to be zero, the above pruning process is a lossless pruning. When the threshold is greater than zero, the above pruning process is a lossy process.

III. Coding and Signaling of Merge Mode

III. 1. Binarization and Context Modeling of Merge Indexes

In one example, a merge index exceeding M (e.g., M is 6) can be coded with a unary prefix and a fix length coding of the rest of bins. FIG. 17 shows an example of codewords for coding merge indexes when the maximum index is 23. As shown, the first 7 indexes are coded with unary codewords. The rest 16 indexes are coded with a unary prefix, and a length of 4 bins.

In another example, the binarization can be modified as shown in FIG. 18. One bin indicates if the index exceeds M (e.g., M is 6). The rest bins of the 0 to M indexes are still unary coded. The rest bins of indexes from M+1 to the last index are fixed length coded.

In another example, the unary codeword can be extended to the additional indexes (indexes exceeding M).

In one example, the bins of merge indexes can be context coded. In another example, the unary part is context coded, and the fixed length part is bypass coded. In another example, each bin uses one context. In another example, each bin can use multiple contexts. In another example, several bins can share one context.

III. 2. Merge Mode Signaling with Sequence Parameter Set (SPS)

In one example, several sequence level parameters are introduced to control the merge mode scheme described herein. For example, one or more offsets are specified for defining a search region for searching for the extended merge candidates. In examples described above, when the Offset_x is equal to Offset_y, one syntax element merge_candidate_search_offset is signaled. The value of Offset_x or Offset_y can be a positive integer, such as 4, 8, 16, 32, 48, 64, 80, 96, and the like. The search block size is also specified by the SPS parameters. When the search blocks are square, one syntax element merge_candidate_search_grid indicating a side length of the search block is signaled. The pruning threshold is also specified at SPS, one syntax element merge_pruning_threshold is signaled at SPS.

An example of the syntax table is shown in FIG. 19. As shown, the parameters merge_candidate_search_offset, merge_candidate_search_grid, and merge_pruning_threshold are included at the end of the SPS.

In another example, when the Offset_x is not equal to Offset_y, two syntax elements merge_candidate_search_offset_x and merge_candidate_search_offset_y are signaled. The value of Offset_x or Offset_y can be a positive integer, such as 4, 8, 16, 32, 48, 64, 80, 96, and the like. When the search blocks are not square, two syntax elements merge_candidate_search_grid_width indicating a width of the search blocks and merge_candidate_search_grid_height indicating a height of the search blocks are signaled. The pruning threshold is also specified at SPS. For example, one syntax element merge_pruning_threshold is signaled at SPS.

An example syntax table is shown in FIG. 20. As shown, the parameters merge_candidate_search_offset_x, merge_candidate_search_offset_y, merge_candidate_search_grid_width, merge_candidate_search_grid_height, and merge_pruning_threshold are shown at the end of the SPS.

In another example, when the Offset_x is not equal to Offset_y, the search block can also be square. In this case, only one syntax element for the search block size is signaled.

In another example, when the Offset_x is equal to Offset_y, the search block can be non-square.

In another example, the above elements can also be signaled by their logarithms. In the above method, the value of Offset_x or Offset_y can be a positive integer, such as 4, 8, 16, 32, 48, 64, 80, 96, and the like. The search block size can be a positive integer, such as 4, 8, 16, 32, 48, 64, 80, 96, and the like. The pruning threshold can be a positive integer, such as 4, 8, 16, 32, 48, 64, 80, 96, and the like.

III. 3. Merge Mode Signaling with Picture Parameter Set (PPS)

In some examples, several picture level parameters are introduced to control the merge mode scheme described herein. For example, one or more offsets are specified for defining a search region for searching for the extended merge candidates. In examples described above, when the Offset_x is equal to Offset_y, one syntax element merge_candidate_search_offset is signaled. The value of Offset_x or Offset_y can be a positive integer, such as 4, 8, 16, 32, 48, 64, 80, 96, and the like. The search block size is also specified by the PPS parameters. When the search blocks partitioned is square, one syntax element merge_candidate_search_grid indicating a side length of the search blocks is signaled. The pruning threshold is also specified at PPS, one syntax element merge_pruning_threshold is signaled at PPS.

An example of the syntax table is shown in FIG. 21. As shown, the parameters merge_candidate_search_offset, merge_candidate_search_grid, and merge_pruning_threshold are included at the end of the PPS.

In another example, when the Offset_x is not equal to Offset_y, two syntax elements merge_candidate_search_offset_x and merge_candidate_search_offset_y are signaled. The value of Offset_x or Offset_y can be a positive integer, such as 4, 8, 16, 32, 48, 64, 80, 96, and the like. The search block size is also specified by the PPS. When the search blocks are not square, two syntax elements merge_candidate_search_grid_width indicating a width of the search blocks and merge_candidate_search_grid_height indicating a height of the search blocks are signaled. The pruning threshold is also specified at PPS. For example, one syntax element merge_pruning_threshold is signaled at PPS.

An example syntax table is shown in FIG. 22. As shown, the parameters merge_candidate_search_offset_x, merge_candidate_search_offset_y, merge_candidate_search_grid_width, merge_candidate_search_grid_height, and merge_pruning_threshold are shown at the end of the PPS.

In another example, when the Offset_x is not equal to Offset_y, the search block can also be square. In this case, only one syntax element for the search block size is signaled.

In another example, the above elements can also be signaled by their logarithms. In the above method, the value of Offset_x or Offset_y can be a positive integer, such as 4, 8, 16, 32, 48, 64, 80, 96, and the like. The search block size can be a positive integer, such as 4, 8, 16, 32, 48, 64, 80, 96, and the like. The pruning threshold can be a positive integer, such as 4, 8, 16, 32, 48, 64, 80, 96, and the like.

III. 4. Slice Level Merge Mode Signaling

In some example, parameters similar to that introduced in sequence level or picture level can be signaled in slice level. For example, the slice level parameters can be included in a slice header and signaled from encoder side to decoder side. Descriptions of slice level merge mode parameters are omitted for the reason of simplicity.

IV. Example Process for Video Coding Using Merge Mode

Figure 23:
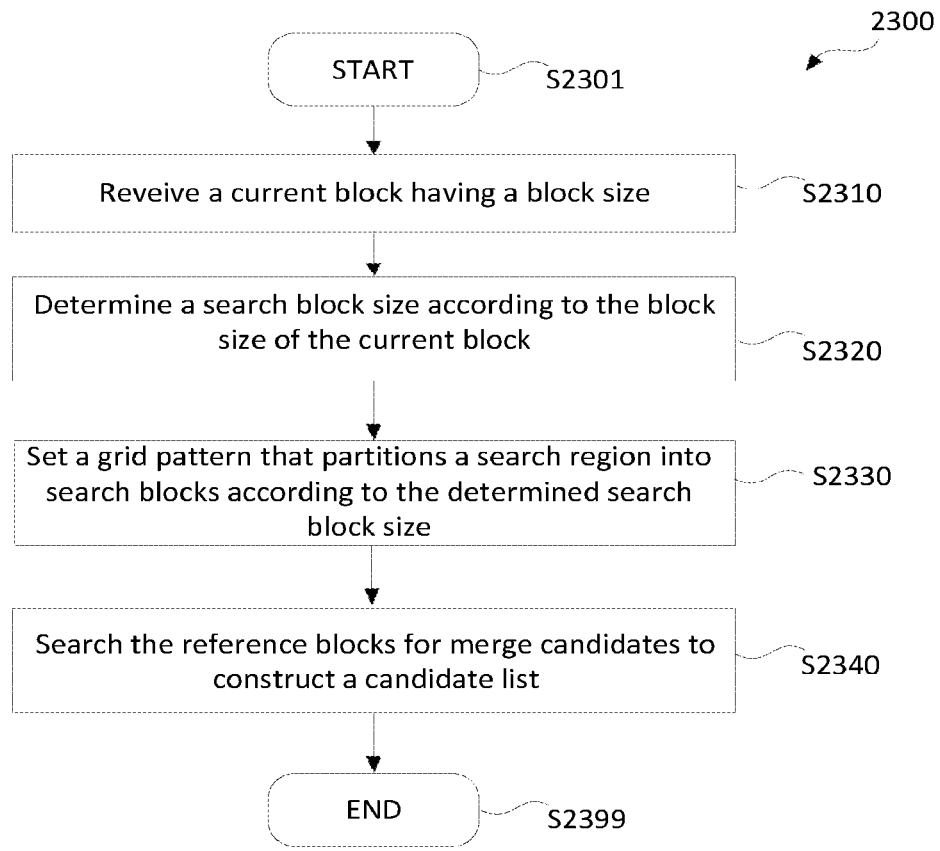
FIG. 23 shows a flowchart of an example process for video coding with a merge mode according to an embodiment of the disclosure.

FIG. 23 shows a flowchart of an example process (2300) for video coding with a merge mode according to an embodiment of the disclosure. The process (2300) can be performed at an encoder side or a decoder side. During the process, searching for merge candidates can be performed over an extended search region that covers areas that are not immediately adjacent to a current block as well as areas that are in touch with the current block. In this way, merge candidates can be found in coding blocks immediately neighboring the current block, and coding blocks that are distributed away from the current block. Compared with HEVC or JEM 7 where merge candidate positions are located near edges of a current block, the extended search region can provide more merge candidate choices. Thus, a potentially better merge candidate may be determined from a respective candidate list. The process (2300) can start from S2301, and proceed to S2310.

At S2310, a current block having a block size is received. A picture under processing can be partitioned into coding blocks according to a tree structure based partition scheme. Sizes of the coding blocks can be adjusted adaptively according to local characteristics (textures) of different regions. Thus, at different locations of the picture, the coding blocks may have different sizes.

At S2320, a search block size is determined according to the block size. For example, when the block size is larger, a bigger search block size can be adopted, while when the block size is smaller, a smaller search block size can be adopted. For example, a threshold of search block size may be used to determine what search block size would be used. Adaptively adjusting the search block size can improve efficiency of searching for merge candidates. For example, when the current block is within an area including more detailed textures, the current block may have a smaller size, and blocks in the neighborhood of the current block may have smaller sizes. Corresponding to this scenario, using a smaller search block size would enable the search to capture more diverse merge candidates. In contrast, at an area with little details, the current block and its neighbor blocks may have a larger size, and different motion data may distributed sparsely. Accordingly, a larger search block size can be used to avoid unnecessary searching operations.

At S2330, a grid pattern can be set or determined according to the search block size determined at S2320. The grid pattern partitions a search region adjacent to the current block into search blocks. Each search block may represent or corresponding to a merge candidate position. For example, a candidate position for obtaining motion data can be a position of any sample within a respective search block. The candidate position can be the position of a top-left corner sample, bottom-right corner sample, and the like. Alternatively, similar to HEVC, a block having a size equal to or smaller than a minimum allowable block size can be used to represent a candidate position in a search block.

At S2340, the search blocks are searched to find available merge candidates at respective candidate positions to construct a candidate list. Various search schemes or orders can be employed. In some examples, every search block is searched. In some examples, a subset of search blocks are searched which include predetermined candidate positions, such as the FIG. 16 example. When construction the candidate list, various methods of inserting merge candidates in the candidate list can be employed. For example, specific positions on the candidate list may be used for adding extended merge candidates. Merge candidates that are not similar to merge candidates already on the list may be added to the merge candidate list while similar merge candidates may not be added to the merge candidate list. The candidate list can later be used in subsequent operations. The process 2300 may proceed to S2399 and terminate at S2399.

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
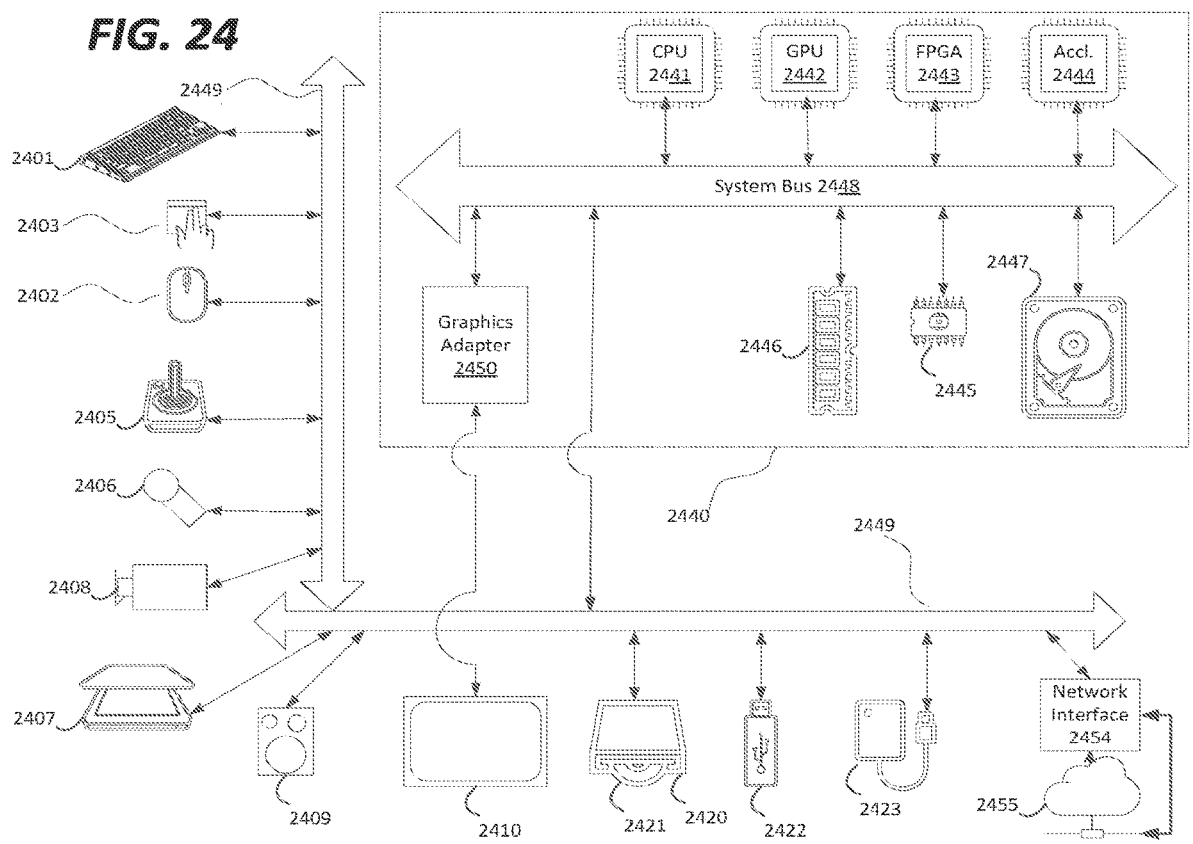
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can be also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2400), and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Appendix A: Acronyms
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit

What is claimed is:

1. A method for video coding using a merge mode by a decoder or encoder, comprising:
receiving a current block having a block size;
setting, prior to performing inter prediction using the merge mode, a grid pattern based on the block size of the current block, wherein the grid pattern partitions a search region adjacent to the current block into search blocks, wherein a size of the search blocks is determined according to the block size of the current block in which:
when the block size of the current block is larger than a first threshold, the search block size is determined to be a first size; and when the block size of the current block is smaller than the first threshold, the search block size is determined to be a second size that is smaller than the first size such that the search blocks with the second size have a higher distribution of search blocks in the search region than the search blocks with the first size;

searching for one or more spatial merge candidates from candidate positions in the search blocks to construct a candidate list that includes the one or more spatial merge candidates, the searching including sequentially performing, until the candidate list includes a maximum number of candidates, a plurality of search rounds over a set of predetermined candidate positions from a nearest neighborhood of the current block to a farthest neighborhood of the current block, the nearest neighborhood being adjacent to the current block, the nearest neighborhood and the farthest neighborhood being separated by at least one search block; and decoding the current block by performing the inter prediction using the merge mode including the one or more spatial merge candidates in the candidate list.

2. The method of claim 1, further comprising:
searching a subset of the search blocks corresponding to the set of predetermined candidate positions for the one or more spatial merge candidates.

3. The method of claim 1, wherein the set of predetermined candidate positions includes a first set of predetermined candidate positions and a second set of predetermined candidate positions, the searching for one or more spatial merge candidates from candidate positions in the search blocks to construct the candidate list further includes:

performing a first round of search from the plurality of search rounds over the first set of predetermined candidate positions in the nearest neighborhood of the current block, the first set of predetermined candidate positions including:
candidate position (d0) located at a bottom-left corner of the current block,
candidate position (a0) located at a left side of the current block and next to the candidate position (d0),
candidate position (c0) located at a top-right corner of the current block,
candidate position (b0) located at a top side of the current block and next to the candidate position (c0), and
candidate position (e0) located at a top-left corner of the current block; and performing a second round of search from the plurality of search rounds over the second set of predetermined candidate positions in a neighborhood that is one search block away from the current block and next to the nearest neighborhood of the current block, the second set of predetermined candidate positions including:
candidate position (d1) located one search block away leftwards from the candidate position (d0),
candidate position (a1) located one search block away leftwards from the candidate position (a0),
candidate position (e1) located one search block away upwards from the candidate position (c0),
candidate position (b1) located one search block away upwards from the candidate position (b0), and
candidate position (e1) located one search block away to the top-left direction of the candidate position (e0).

4. The method of claim 3, wherein the searching for one or more spatial merge candidates from candidate positions in the search blocks to construct the candidate list further comprises:
determining whether the candidate list includes the maximum number of candidates after the first round of search;
when the candidate list does not include the maximum number of candidates, proceeding with the second round of search; and
when the candidate list includes the maximum number of candidates, terminating the searching for one or more spatial merge candidates to construct the candidate list.

5. The method of claim 1, wherein the sequentially performing the plurality of search rounds from the nearest neighborhood of the current block to the farthest neighborhood of the current block includes each round of search being performed on a respective neighborhood, wherein:
(a) a first round of the plurality of search rounds is performed over the nearest neighborhood that includes the following predetermined candidate positions:
first candidate position (d0) located at a bottom-left corner of the current block,
second candidate position (a0) located at a left side of the current block and next to the first candidate position (d0),
third candidate position (c0) located at a top-right corner of the current block,
fourth candidate position (b0) located at a top side of the current block and next to the third candidate position (c0), and
fifth candidate position (e0) located at a top-left corner of the current block; and
(b) a next round of the plurality of search rounds is performed over a next neighborhood after a previous round of the plurality of search rounds that is performed over a previous neighborhood, the next neighborhood is one search block away from the previous neighborhood of the current block, the next neighborhood includes the following predetermined candidate positions:
first candidate position (dN) located one search block away leftwards from the first candidate position (dP) of the previous neighborhood,
second candidate position (aN) located one search block away leftwards from the second candidate position (aP) of the previous neighborhood,
third candidate position (cN) located one search block away upwards from the third candidate position (cP) of the previous neighborhood,
fourth candidate position (bN) located one search block away upwards from the fourth candidate position (bP) of the previous neighborhood, and
fifth candidate position (eN) located one search block away to the top-left direction of the fifth candidate position (eP) of the previous neighborhood.

6. The method of claim 1, wherein the search region includes a first set of candidate positions as defined in the high efficiency video coding (HEVC) standard in search blocks of a first neighborhood adjacent to the current block, and the candidate positions, from which the one or more spatial merge candidates are searched for, are extended, left-wards, top-wards and left-top-wards with respect to the first set of candidate positions at the left, top and left-top of the current block, respectively, from the first neighborhood adjacent to the current block to neighborhoods that are non-adjacent to the current block, and are a search block away from the current block.

7. The method of claim 1, further comprising:
adding the one or more spatial merge candidates except a set of spatial merge candidates selected from the search blocks immediately adjacent to the current block to the candidate list at positions after a temporal merge candidate.

8. The method of claim 1, further comprising:
comparing a merge candidate obtained by searching the search region with an existing merge candidate listed on the candidate list;
when a difference between the obtained merge candidate and the existing merge candidate is larger than a pruning threshold, adding the obtained merge candidate to the candidate list; and
when the difference between the obtained merge candidate and the existing merge candidate is smaller than the pruning threshold, not adding the obtained merge candidate to the candidate list.

9. The method of claim 1, wherein the search blocks have a square and/or non-square shape.

10. The method of claim 1, comprising:
signaling one of the following syntax elements from the encoder in sequence level, picture level, or slice level:
a first syntax element indicating an offset with respect to the current block for defining the search region, wherein an x coordinate and y coordinate of a top-left corner sample of the search region are equal with each other, and take the value of the offset;
a second syntax element indicating a shape of the search blocks having a square shape;
a third syntax element indicating a pruning threshold;
a fourth syntax element and a fifth syntax element indicating an x direction offset and a y direction offset with respect to the current block for defining the search region, wherein the x coordinate and y coordinate of the top-left corner sample of the search region are not equal with each other, and take the values of the x direction offset and y direction offset, respectively; or
a sixth syntax element and a seventh syntax element indicating a width and a height of the search blocks having a rectangle shape.

11. An apparatus for encoding or decoding video using a merge mode, comprising circuitry configured to:
receive a current block having a block size;
set, prior to performance of inter prediction using the merge mode, a grid pattern based on the block size of the current block, wherein the grid pattern partitions a search region adjacent to the current block into search blocks wherein a size of the search blocks is determined according to the block size of the current block in which:
when the block size of the current block is larger than a first threshold, the search block size is determined to be a first size, and
when the block size of the current block is smaller than the first threshold, the search block size is determined to be a second size that is smaller than the first size such that the search blocks with the second size have a higher distribution of search blocks in the search region than the search blocks with the first size;
search for one or more spatial merge candidates from candidate positions in the search blocks to construct a candidate list that includes the one or more spatial merge candidates, the search including sequential performance of, until the candidate list includes a maximum number of candidates, a plurality of search rounds over a set of predetermined candidate positions from a nearest neighborhood of the current block to a farthest neighborhood of the current block, the nearest neighborhood being adjacent to the current block, the nearest neighborhood and the farthest neighborhood being separated by at least one search block; and
decode the current block by performance of the inter prediction using the merge mode including the one or more spatial merge candidates in the candidate list.

12. The apparatus of claim 11, wherein the set of predetermined candidate positions includes a first set of predetermined candidate positions and a second set of predetermined candidate positions, wherein the circuitry is further configured to:
perform a first round of search from the plurality of search rounds over the first set of predetermined candidate positions in the nearest neighborhood of the current block, the first set of predetermined candidate positions including:
candidate position (d0) located at a bottom-left corner of the current block,
candidate position (a0) located at a left side of the current block and next to the candidate position (d0),
candidate position (c0) located at a top-right corner of the current block,
candidate position (b0) located at a top side of the current block and next to the candidate position (c0), and
candidate position (e0) located at a top-left corner of the current block; and
perform a second round of search from the plurality of search rounds over the second set of predetermined candidate positions in a neighborhood that is one search block away from the current block and next to the nearest neighborhood of the current block, the second set of predetermined candidate positions including:
candidate position (d1) located one search block away leftwards from the candidate position (d0),
candidate position (a1) located one search block away leftwards from the candidate position (a0),
candidate position (c1) located one search block away upwards from the candidate position (c0),
candidate position (b1) located one search block away upwards from the candidate position (b0), and
candidate position (e1) located one search block away to the top-left direction of the candidate position (e0).

13. The apparatus of claim 11, wherein the search region includes a first set of candidate positions as defined in the high efficiency video coding (HEVC) standard in search blocks of a first neighborhood adjacent to the current block, and the candidate positions, from which the one or more spatial merge candidates are searched for, are extended, left-wards, top-wards and left-top-wards with respect to the first set of candidate positions at the left, top and left-top of the current block, respectively, from the first neighborhood adjacent to the current block to neighborhoods that are non-adjacent to the current block, and are a search block away from the current block.

14. A non-transitory computer-readable medium storing instructions that, when executed by a processor, cause the processor to perform a method for video coding using a merge mode, the method comprising:

receiving a current block having a block size;

setting, prior to performing inter prediction using the merge mode, a grid pattern based on the block size of the current block, wherein the grid pattern partitions a search region adjacent to the current block into search blocks, a size of the search blocks is determined according to the block size of the current block in which:

when the block size of the current block is larger than a first threshold, the search block size is determined to be a first size, and when the block size of the current block is smaller than the first threshold, the search block size is determined to be a second size that is smaller than the first size such that the search blocks with the second size have a higher distribution of search blocks in the search region than the search blocks with the first size;

searching for one or more spatial merge candidates from candidate positions in the search blocks to construct a candidate list that includes the one or more spatial merge candidates, the searching including sequentially performing, until the candidate list includes a maximum number of candidates, a plurality of search rounds over a set of predetermined candidate positions from a nearest neighborhood of the current block to a farthest neighborhood of the current block, the nearest neighborhood being adjacent to the current block, the nearest neighborhood and the farthest neighborhood being separated by at least one search block; and decoding the current block by performing the inter prediction using the merge mode including the one or more spatial merge candidates in the candidate list.

15. The non-transitory computer-readable medium of claim 14, wherein the set of predetermined candidate positions includes a first set of predetermined candidate positions and a second set of predetermined candidate positions, wherein the method further comprises:

performing a first round of search from the plurality of search rounds over the first set of predetermined candidate positions in the nearest neighborhood of the current block, the first set of predetermined candidate positions including:

candidate position (d0) located at a bottom-left corner of the current block, candidate position (a0) located at a left side of the current block and next to the candidate position (d0), candidate position (c0) located at a top-right corner of the current block, candidate position (b0) located at a top side of the current block and next to the candidate position (c0), and candidate position (e0) located at a top-left corner of the current block; and performing a second round of search from the plurality of search rounds over the second set of predetermined candidate positions in a neighborhood that is one search block away from the current block and next to the nearest neighborhood of the current block, the second set of predetermined candidate positions including:

candidate position (d1) located one search block away leftwards from the candidate position (d0), candidate position (a1) located one search block away leftwards from the candidate position (a0), candidate position (c1) located one search block away upwards from the candidate position (c0), candidate position (b1) located one search block away upwards from the candidate position (b0), and candidate position (e1) located one search block away to the top-left direction of the candidate position (e0).

16. The non-transitory computer-readable medium of claim 14, wherein the method further comprises:

adding the one or more spatial merge candidates except a set of spatial merge candidates selected from the search blocks immediately adjacent to the current block to the candidate list at positions after a temporal merge candidate.

17. The method of claim 1, wherein the search region is split into at least a first sub-region and second sub-region, wherein a size of the search blocks in the first sub-region is different from a size of the search blocks in the second sub-region.

* * * * *